(12) United States Patent
Torres da Silveira et al.

(10) Patent No.: US 11,379,813 B2
(45) Date of Patent: Jul. 5, 2022

(54) SYSTEM AND METHOD FOR POINT OF SALE TRANSACTIONS USING WIRELESS DEVICE WITH SECURITY CIRCUIT

(71) Applicant: NewStore, Inc., Boston, MA (US)

(72) Inventors: Bernardo Joao Torres da Silveira, Berlin (DE); Ulrike Vanessa Mueller, Boston, MA (US); Jan-Oliver Pantel, Berlin (DE); Pavel Pascari, Berlin (DE); Henning Witzel, Berlin (DE)

(73) Assignee: NewStore Inc., Boston, MA (US)

( * ) Notice: Subject to any disclaimer, the term of this patent is extended or adjusted under 35 U.S.C. 154(b) by 366 days.

(21) Appl. No.: 16/234,959

(22) Filed: Dec. 28, 2018

(65) Prior Publication Data

US 2019/0205859 A1 Jul. 4, 2019

Related U.S. Application Data

(60) Provisional application No. 62/612,903, filed on Jan. 2, 2018.

(51) Int. Cl.
*G06Q 20/20* (2012.01)
*G06Q 20/40* (2012.01)
*G06Q 20/32* (2012.01)
*G06K 7/14* (2006.01)

(52) U.S. Cl.
CPC ......... *G06Q 20/206* (2013.01); *G06K 7/1413* (2013.01); *G06K 7/1417* (2013.01); *G06Q 20/202* (2013.01); *G06Q 20/32* (2013.01); *G06Q 20/3226* (2013.01); *G06Q 20/40* (2013.01); *G06Q 20/401* (2013.01)

(58) Field of Classification Search
CPC .... G06Q 20/206; G06Q 20/202; G06Q 20/32; G06K 7/1413; G07K 7/1417
USPC ...... 705/18, 26.35, 325, 21, 17, 23; 235/375
See application file for complete search history.

(56) References Cited

U.S. PATENT DOCUMENTS

| | | | |
|---|---|---|---|
| 8,832,465 B2 | 9/2014 | Gulati et al. | |
| 2004/0019564 A1* | 1/2004 | Goldthwaite | G06Q 20/12 705/44 |
| 2005/0027543 A1* | 2/2005 | Labrou | G06Q 20/12 705/26.35 |
| 2012/0143706 A1* | 6/2012 | Crake | G06Q 20/206 705/18 |
| 2013/0308838 A1 | 11/2013 | Westerman et al. | |
| 2014/0058862 A1* | 2/2014 | Celkonas | G06Q 20/102 705/18 |
| 2015/0032578 A1* | 1/2015 | Bicer | H04L 63/18 705/26.82 |
| 2015/0058191 A1* | 2/2015 | Khan | G06Q 20/40 705/35 |

(Continued)

*Primary Examiner* — Vanel Frenel
(74) *Attorney, Agent, or Firm* — Intrinsic Law Corp.

(57) ABSTRACT

A computer-implemented method and device for secure checkout in a retail environment such as at a point of sale location in a store. Each of a customer and a sales associate at the point of sale operate respective mobile communication devices that are equipped to exchange signals and receive the same from one another. The sales associate device sends, inter alia, a physical signal causing the customer device to link to a payment application and server, which is followed by a sequence of authentication steps enabled by a physical authentication unit on the customer's device to ensure and confirm authenticated secure transactions.

23 Claims, 18 Drawing Sheets

(56) References Cited

U.S. PATENT DOCUMENTS

| | | | |
|---|---|---|---|
| 2016/0275510 A1* | 9/2016 | Buchholtz | G06Q 20/34 |
| 2018/0096566 A1* | 4/2018 | Blair, II | G06Q 20/3278 |
| 2019/0108509 A1* | 4/2019 | Hammad | G06Q 20/227 |
| 2019/0188682 A1* | 6/2019 | Itwaru | G06Q 20/3276 |

* cited by examiner

SYSTEM AND METHOD FOR POINT OF SALE TRANSACTIONS USING WIRELESS DEVICE WITH SECURITY CIRCUIT

CROSS REFERENCE TO RELATED APPLICATIONS

This application claims priority to U.S. Provisional Application No. 62/612,903, titled "Systems and Methods for Mobile Point of Sale Using Two Mobile Phones," filed on Jan. 2, 2018.

TECHNICAL FIELD

This application relates generally to electronic commerce, and, more specifically, to methods and systems for facilitating payment of products/goods and services using mobile communication devices and secured circuits therein.

BACKGROUND

In modern stores the classical cash register is replaced with a mobile solution called mobile point of sale (mPOS). Using the existing mPOS system, a sales associate can check out a customer on the spot without the customer having to wait in line in front of a cash register. The sales associate is equipped with a mobile phone and a credit card reader, sometimes combined into one device. The credit card reader typically supports reading a card's magnetic strip or the card's chip, or it uses near-field communication (NFC) technology to receive the card information wirelessly.

In existing mPOS payment transactions, the credit card reader reads all data from the credit card and encrypts it. That encrypted payment data is sent to the connected sales associate phone. The sales associate phone sends the encrypted data to a payment gateway service, which converts the encrypted payment data into an anonymous payment token. That token is sent back to the sales associate phone. Next, the sales associate phone connects to the payment gateway service to authorize the payment. The successful authorization is then sent to the retailer's transaction server.

Even though it is beneficial to the customer, this approach requires the retailer to invest in specialized mobile card readers. It would be desirable to overcome this and other deficiencies of existing mPOS systems.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

One or more embodiments are directed to a computer-implemented method for secure checkout at a point of sale, comprising on a customer mobile communication device that includes a hardware processor and a physical authentication unit coupled to said processor, the customer mobile communication device associated with a customer detecting and decoding a physical communication signal from a sales associate device, by way of a physical signal sensor or receiver in said customer mobile communication device, the physical communication signal encoding a selectable link providing access to a customer payment application and further encoding a unique customer order identifier associated with an order being processed at said point of sale; activating said customer payment application by actuation of said selectable link on a user interface of said customer mobile communication device; sending a customer order request, corresponding to said customer order identifier, over a secure communication connection, to a payment server; receiving, in response to the customer order request, customer order data including a cost for the customer order; generating a secure payment request; authenticating the customer on said customer mobile communication device, using customer authentication data securely stored on said physical authentication unit; retrieving customer payment account information from said physical authentication unit on the customer mobile communication device; encoding said customer payment account information in said secure payment request; sending said customer payment request including said customer payment account information from the customer mobile communication device to the payment server, over said secure communication connection; and receiving a payment authorization message from said payment server responsive to the sent customer payment request.

Other embodiments are directed to a customer mobile communication device associated with a customer and configured and arranged to conduct secure transactions at a point of sale, the customer mobile communication device comprising a hardware processor; a secure communication interface operatively coupled to said hardware processor; a user interface of said customer mobile communication device operatively responsive to inputs by said customer and outputs from said hardware processor; a physical signal sensor or receiver operatively coupled to the processor; a physical authentication unit operatively coupled to the processor; a non-transitory memory unit operatively coupled to the processor, the non-transitory memory comprising computer-readable instructions that cause the physical signal sensor or receiver to detect and decode a physical communication signal, sent by a sales associate device at said point of sale, the physical communication signal encoding a selectable link providing access to a customer payment application and further encoding a unique customer order identifier associated with an order being processed at said point of sale; computer-readable instructions that cause the user interface to present a selectable link corresponding to the customer payment application; computer-readable instructions that cause the secure communication interface to send a customer order request, corresponding to said customer order identifier, to a payment server; computer-readable instructions that cause the secure communication interface to receive, in response to said customer order request, customer order data including a cost for the customer order; computer-readable instructions that cause said processor to generate a secure payment request; computer-readable instructions that cause said physical authentication unit and processor to authenticate said customer on the customer mobile communication device using authentication data securely stored in said physical authentication unit; computer-readable instructions that retrieve customer payment account information from said physical authentication unit on the customer mobile communication device; computer-readable instructions that encode said customer payment account information in said secure payment request; computer-readable instructions that cause the secure communication interface to send said customer payment request including said customer payment account information from the customer mobile communication device to the payment server, over said secure communication connection; and computer-readable instructions that receive a payment authorization message from said payment server responsive to the sent customer payment request.

The computer-readable instructions can be encoded into physical storage media such as non-volatile digital storage units.

The physical signals above can include optical signals such as those used by QR code readers, bar code readers, optical character recognizers, cameras and the like. The physical signals can also be radio signals such as RF communication signals and can encode data therein such as electronic mail (email) or short message service (SMS) or similar message data detected by and decoded in a radio receiver unit.

BRIEF DESCRIPTION OF THE DRAWINGS

For a fuller understanding of the nature and advantages of the present concepts, reference is made to the following detailed description of preferred embodiments and in connection with the accompanying drawings, in which.

DETAILED DESCRIPTION

This disclosure describes a technological improvement and technological solution to one or more deficiencies of the existing mPOS approach. In this technology, the sales associate uses a mobile phone and doesn't require a card reader, and the customer's mobile phone is used for the actual payment.

When the customer is ready to purchase items/services from a retail store, she notifies a sales associate. The sales associate scans the items/services to be purchased into a virtual shopping bag in a sales associate application ("app") running on the sales associate's phone. Alternatively, the sales associate app receives the contents of the customer's virtual shopping bag (e.g., over a Bluetooth connection), which includes items/services added by the customer using a customer payment app on the customer's phone. Next, the sales associate presses the "checkout" button on the sales associate app, which causes the sales associate app to generate a quick response (QR) code that includes a link to retrieve (e.g., from a payments server) the total amount due and optionally other details relating to the transaction, such as the contents and prices of the items in the shopping bag.

After the customer scans the QR code using a QR reader app on the customer's mobile phone, the customer payment app prompts the customer to select a payment option including a secure payment option called "Pay on Consumer Phone" or "NewStore Checkout" (in general, NewStore Checkout) where the customer can pay electronically without having to provide her credit card information to the sales associate. The customer can link the NewStore Checkout option with (a) a secure mobile payment solution application, such as APPLE PAY® (available from Apple Inc.), that uses payment data stored on the customer's mobile phone or (b) another secure mobile payment method enabled on the customer's mobile phone, such as PayPal ONE TOUCH™ (available from PayPal, Inc.). The payment data on the customer's mobile phone can be locally stored in a security chip that is only available to the mobile phone's main processor upon user authentication, which can include biometric authentication. The customer can then pay for the items/services in the shopping bag using the NewStore Checkout option. One or more of the secure mobile payment solutions can comply with one or more specifications or standards, such as one or more EMV® specifications published by EMVCo.

Figure 1:
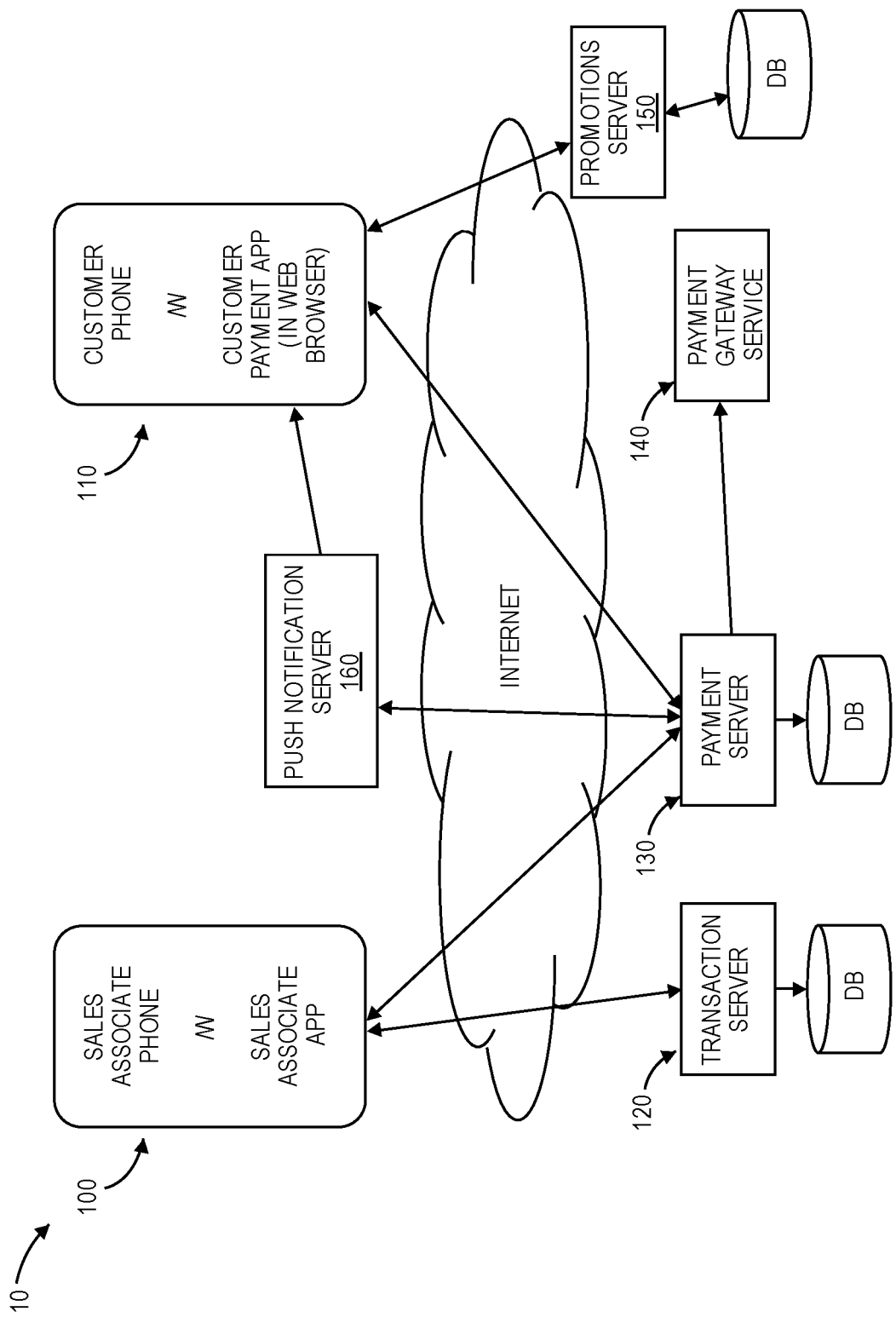
FIG. 1 is a block diagram of an improved mPOS system according to one or more embodiments.

FIG. 1 is a block diagram of an improved mPOS system 10 according to one or more embodiments. mPOS system 10 includes a sales associate phone 100, a customer phone 110, an optional transaction server 120, a payment server 130, a payment gateway service 140, and a promotions server. The sales associate phone 100 can be a modern and/or state-of-the-art mobile phone (e.g., a smartphone) with a touch screen. The sales associate phone 100 can be connected to a WiFi network in the retail store, which connects to the internet. The sales associate phone 100 can also be connected to a mobile data network (e.g., 3G, 4G, LTE, etc.) and from there to the internet. The sales associate phone 100 is securely connected (e.g., via an encrypted connection), through the internet and the in-store WiFi network and/or the mobile data network, to transaction server 120 and to payment server 130.

The sales associate app executes or runs on the sales associate phone 100. The sales associate app is used for the actual check-out of the customer's purchase. Additional details of the sales associate app are described below.

The customer phone 110 can be a modern and/or state-of-the-art mobile phone (e.g., a smartphone) with a touch screen, a built-in camera, a biometric sensor (e.g., fingerprint, facial recognition, eye scanner, and/or voice recognition), memory, a web browser, a QR code scanner app, an optional text messaging application, and an optional security chip for secure storage of payment information or data (e.g., credit card data). For example, Apple Inc. refers to the security chip on the IPHONE® as a "Secure Enclave." The customer phone 110 is connected to the internet via a mobile data network (e.g., 3G, 4G, LTE, etc.) and/or the in-store WiFi network. The customer phone 110 is securely connected (e.g., via an encrypted connection), through the internet and the in-store WiFi network and/or the mobile data network, to the payment server 130 and to the payment gateway service 140.

More generally, a secure physical authentication unit (which may comprise an on-device chip or circuit) is used to accomplish some or all security features herein, in coordination with a hardware processor of said communication devices.

The customer phone 110 can send and receive text messages using the text messaging application. In addition, the customer phone 110 can have the ability to send and receive emails, such as through the web browser or through a dedicated application (e.g., the GMAIL® application). The web browser can be pre-installed on the customer phone 110 or it can be downloaded by the customer after purchase of the customer phone 110.

In addition, the customer phone 110 can scan and process a quick response (QR) code. In one example, the customer phone 110 has a dedicated QR code scanner app, or bar code reader for decoding optical physical signals sent over the air (optically) from an associate communication device to a proximal customer mobile communication device. In another example, the QR code scanning capability is integrated into the camera app. In either option, the QR codes are read using the phone's built-in camera. For example, QR code scanning capability has been integrated into the camera app of the IPHONE® since IOS® version 11, which was released in 2017.

The customer phone 110 can store payment information or data (e.g., a credit card number, a unique identifier associated with the customer's credit card number, etc.) securely in its internal memory. In some embodiments, the payment information or data is stored in an optional security chip. This payment information or data can be accessed by a mobile payment solution or app, such as APPLE PAY® (available from Apple Inc.) on IOS®-based devices (e.g., IPHONE®, IPAD®, etc.) or ANDROID PAY™ (available from Google Inc.) on ANDROID®-based devices (e.g., Samsung S8). The payment information or data can also include a unique payment token (e.g., a tokenized Device Account Number) that represents the user's account, credit card, and/or debit card. The payment information or data can also include a dynamically-generated security code for each transaction. The payment information/data and/or the mobile payments solution or app can comply with one or more specifications or standards, such as the EMV® specifications published by EMVCo.

A customer payment app executes or runs on the customer phone 110. The customer payment app is downloaded from the payment server 130 and can execute/run on the web browser on the customer phone 110. The customer payment app can be a small app and can be written in a programming language such as JAVASCRIPT®. Alternatively, the customer payment app can be a dedicated app.

Figure 2:
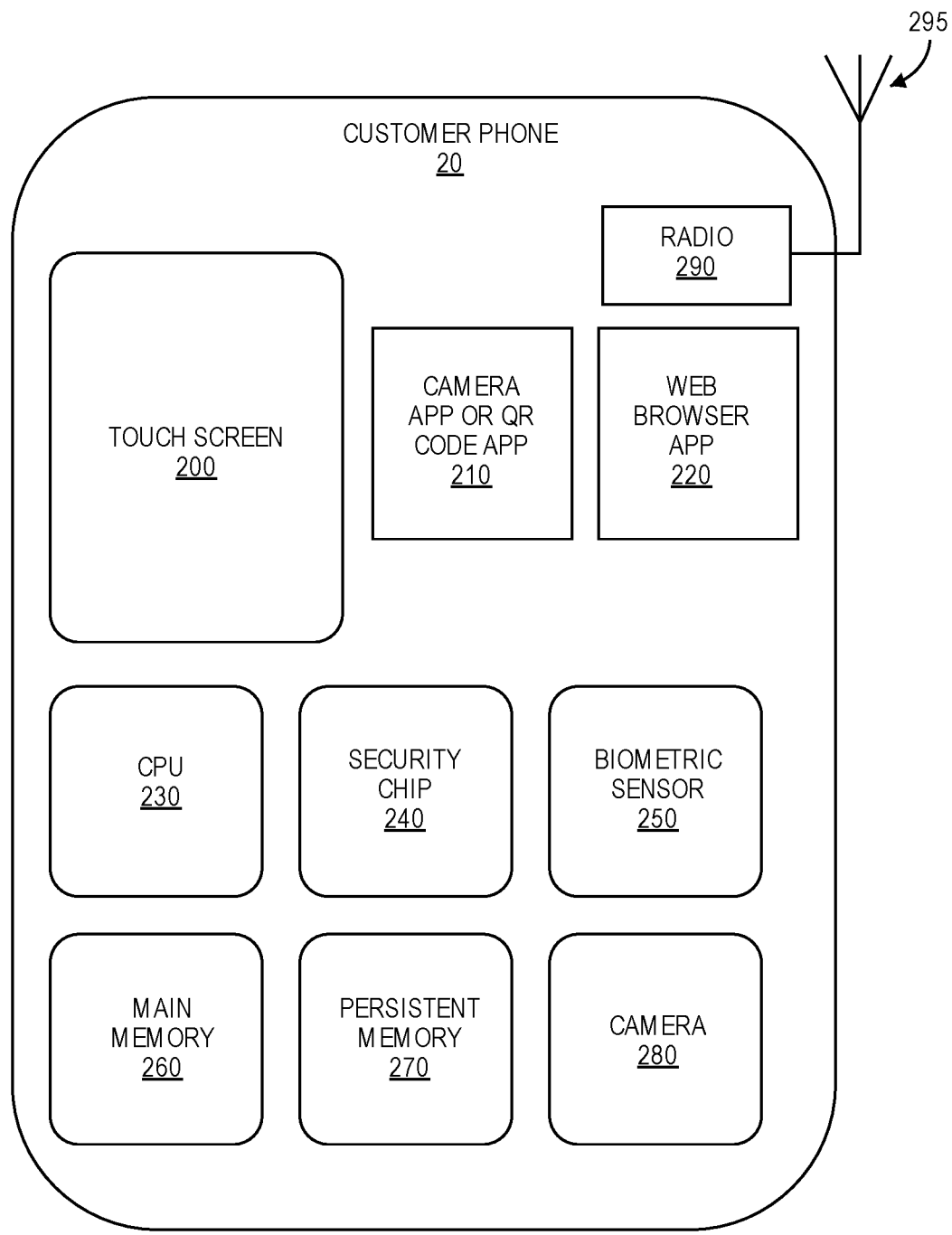
FIG. 2 illustrates an example embodiment of a customer phone.

An example embodiment of customer phone 110 is illustrated in FIG. 2. In FIG. 2, customer phone 20 includes a touch screen 200, a QR code reader 210, a web browser app 220, a hardware-based processor 230, an optional security chip 240, an optional biometric sensor 250, main memory 260, persistent memory 270, a camera 280, one or more wireless radios 290, and one or more antennae 295.

Reference to security chip 240 is meant as an example of a physical authentication unit 240, and those skilled in the art can appreciate various physical components that would achieve the functions and be configured and arranged as discussed herein. This includes integrated circuit (IC) chip units, printed circuitry, or other hardware and/or manufactured means for performing the same.

The touch screen 200 allows the customer to interact with the phone 20 including with web browser app 220. The QR code reader 210 can be integrated in the camera app or it can be a dedicated QR code app, as discussed above. The web browser app 220 can be a pre-installed web browser or a web browser installed by the customer after purchase of the phone 20. The hardware-based processor or CPU 230 provides the logic and processing power to run the operating system and apps on the phone 20. The optional security chip 240 can store the customer's payment information or data and it can store prestored biometric data, which are used to authenticate the user. The payment information or data can also include a unique payment token (e.g., a tokenized Device Account Number) that represents the user's account, credit card, and/or debit card. The payment information or data can also include a dynamically-generated security code for each transaction. The payment information/data and/or the mobile payments solution or app can comply with one or more specifications or standards, such as the EMV® specifications published by EMVCo.

An example of the optional security chip 240 is disclosed in U.S. Pat. No. 8,832,465, titled "Security Enclave Processor for a System on a Chip," issued on Sep. 9, 2014, which is hereby incorporated by reference.

The biometric sensor 250 can be a fingerprint sensor, facial recognition, an eye scanner, and/or voice recognition. The biometric sensor 250 can be used to authenticate the customer when making a purchase using a mobile payment solution application (e.g., APPLE PAY®), for example as discussed above. The biometric sensor 250 can also be used to authenticate the customer to unlock the phone after a period of non-use. To biometrically authenticate, the customer uses the biometric sensor 250 to generate biometric authentication data (e.g., fingerprint sensor data) that the security chip 240 compares with the prestored biometric data to determine if they match (e.g., there's sufficient similarity therebetween). A match confirms the identity of the user/customer to purchase the goods and/or to unlock the phone. Additional details regarding biometric data matching can be found in U.S. Patent Application Publication No. 2013/0308838, titled "Efficient Texture Comparison," filed on Mar. 12, 2013, which is hereby incorporated by reference.

Main memory 260 and persistent memory 270 can be used to store and run, respectively, the operating system and apps on the phone 20. The camera 280 can be used to capture a QR code, which can be read by QR code reader 210. As discussed, the QR code reader 210 can be integrated into the camera app for camera 280, in which case the customer only needs to open the camera app and direct the camera 280 on the QR code displayed on the sales associate phone 100. The associate device can send a selectable link to a payment app that is executed or actuated on the customer device. When the QR code is read, or other physical signal encoding said link is detected and decoded, the web browser app 220 and the customer payment app are opened automatically.

The wireless radio(s) 290 and antenna(e) 295 allow the customer phone 20 to connect to a wireless network, such as a WiFi network and/or a cellular network (e.g., LTE), to communicate with other devices (e.g., with payment server 130, promotions sever 150, and/or sales associate phone 100) as described herein.

The sales associate phone 100 can be the same as or different than customer phone 20. For example, the sales associate phone 100 can have some or all of the features as customer phone 20. In a specific example, the main memory 260 and persistent memory 270 on the sales associate phone 100 can be used to store and run, respectively, the operating system and the sales associate app.

Returning to FIG. 1, the optional transaction server 120 coordinates the virtual shopping bag and the checkout, records the actual transaction, and manages the capture and settlement of funds. The transaction server 120 can be located at the retailer's site or at a service provider on behalf of the retailer. The transaction server 120 can be accessible with secure connections (e.g., encrypted) over the internet. A transaction server database can be connected to the transaction server 120 to store some or all of the details about a check-out transaction.

The payment server 130 coordinates the payment process. The payment server 130 can be located at the retailer's site (e.g., co-located with optional transaction server 120) or at a service provider's site on behalf of the retailer. The payment server 130 can be connected to the internet and can be accessed through a secure connection (e.g., an encrypted connection). The payment server 130 can be reached through a simple domain name server (DNS) of this applicant, which allows short URL names or through a domain name provided by a brand in question, or a combination thereof. As an example, if this applicant's DNS is identified using the https protocol and a string including "https://pay.newstore.com", the retail brand moniker may include a string such as http://pay.somebrandname.com and a combined string may be used such as https://somebrandname.pay.newstore.com." Such short URL names can fit into and can be embedded in a QR code, as further discussed below. A payment server database can be connected to the payment server 130 to store information about a secure "NewStore Checkout" transaction as described herein.

The payment gateway service 140 performs the actual payment processing and connects with the customer's bank or credit card company. The payment gateway service 140 can receive encrypted payment information or data (e.g., credit card data), generate a payment token based on the encrypted payment information/data, and then authorize, settle, void, and/or refund a payment. Examples of commercially-available payment gateway services are available from Stripe, Adyen, CyberSource, and FirstData.

Figure 18:
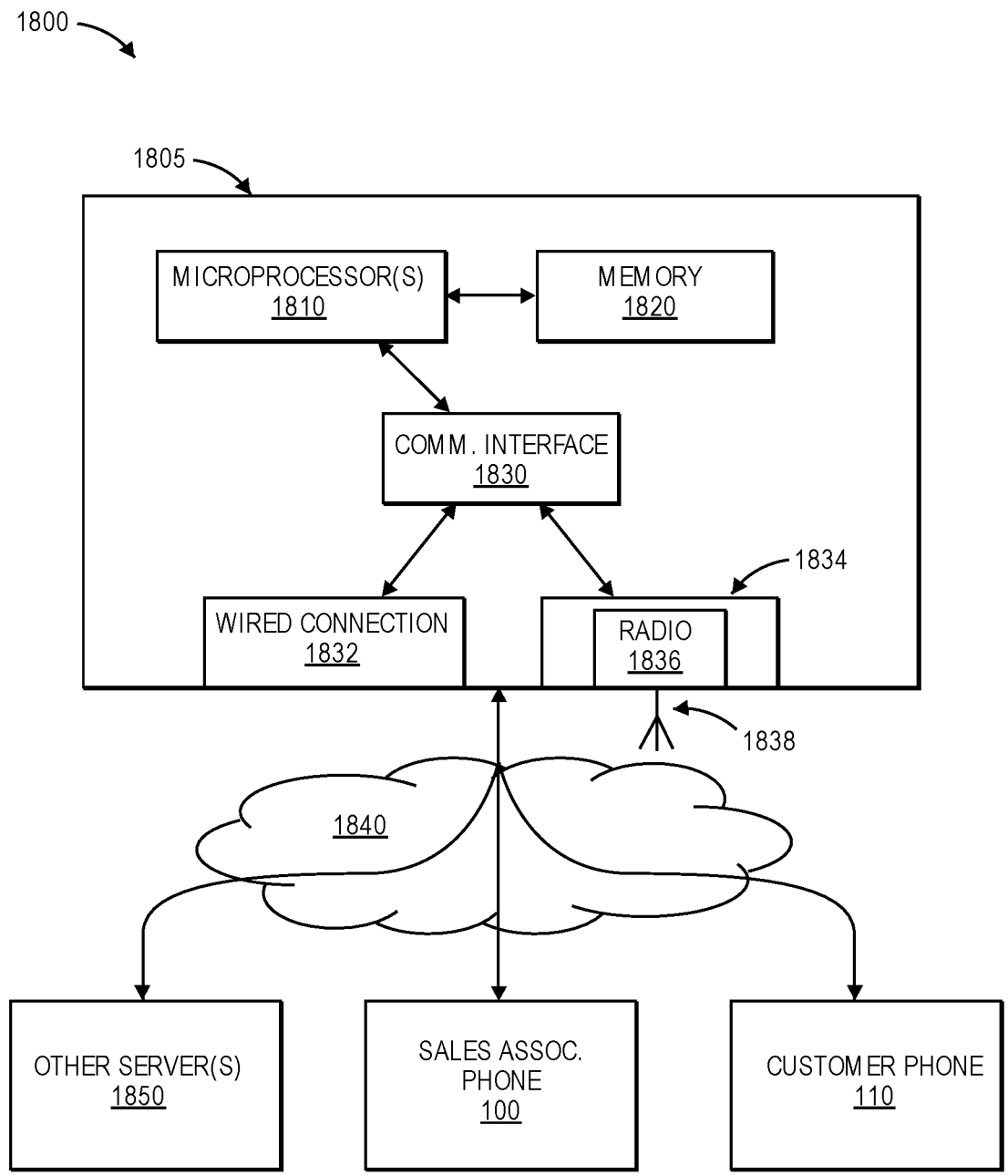
FIG. 18 is a block diagram of an embodiment of one or more of the servers described herein.

FIG. 18 is a block diagram of an embodiment of a server 1800 that can be the same as or different than the transactions server 120, the payment server 130, the payment gateway service 140, the promotions server 150, and/or the push notification server 160. Server 1800 include at least one hardware-based microprocessor 1810, memory 1820 (e.g., main memory and/or persistent memory), and a communications interface 1830. The microprocessor(s) 1810 and memory 1820 can be used to store and run the respective server's operating system, applications, and/or other software. The communications interface 1830 can provide a network connection 1840 to other server(s) 1850 (e.g., between payment server 130 and push notification server 160), to sales associate phone 100, to customer phone 110, and/or to other computers or devices. The communications interface can include a wired connection 1832 (e.g., Ethernet) and/or a wireless connection 1834 (e.g., WIFI, cellular, and/or Bluetooth), either of which can be to a local area network (LAN) or a wide area network (WAN). The LAN or WAN can provide a direct or indirect connection (e.g., via other LANs, WANs, or other networks) to the public internet and/or to a virtual private network. The wireless connection 1834 includes at least one radio 1836 and at least one antenna 1838, which can be internal or external to the housing 1805 of server 1800.

Returning to FIG. 1, in some embodiments, system 10 includes an optional push notification server 160. The push notification server 160 is an optional service provider, reachable through the internet, that provides the ability to send notifications from a server (e.g., from payment server 130) to a specific mobile phone (e.g., to customer phone 110).

Figure 3:
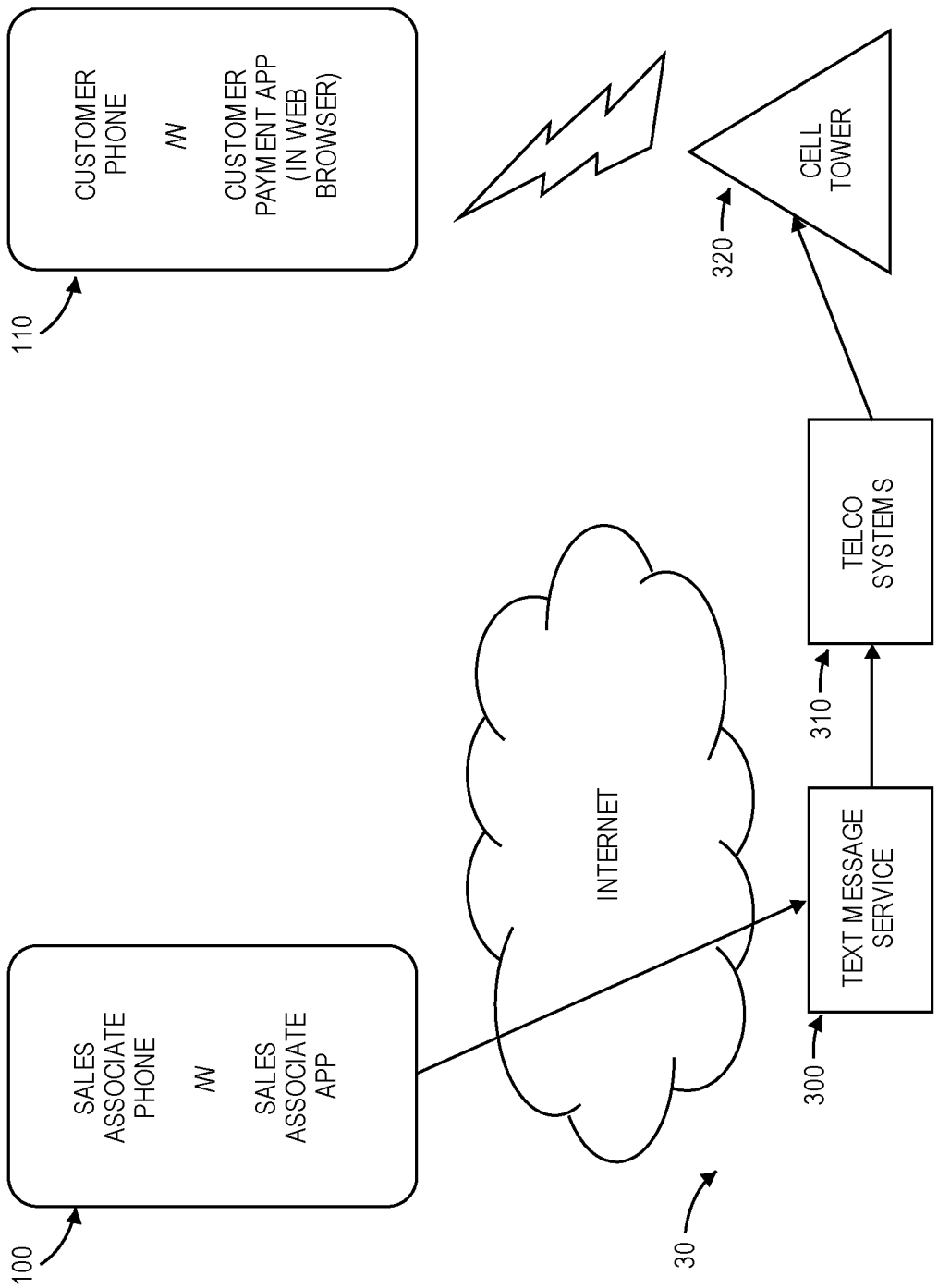
FIG. 3 illustrates an example of a system for sending text messages to a customer.

In addition, or in the alternative, system 10 includes an optional text message gateway service. The text message gateway service is an optional service provider, reachable through the internet, which can send text messages to a mobile phone number. An example of a system 30 for sending text messages to a customer is illustrated in FIG. 3. System 30 includes text message gateway service 300, telephone company systems 310, and cell tower 320. The text message gateway service 300 can be hosted on a server provided by the text message service provider or it can be provided by a third party (e.g., Amazon Web Services). The text message gateway service 300 is in communication with telephone company systems 310 which include the network and backbone of a commercial cellular telecommunications service provider, including cell tower 320.

In operation, sales associate phone 100 sends a command to send a text message over the internet (e.g., via a WiFi network and/or a cellular network) to text message gateway service 300. Text message gateway service 300 receives and processes the text message command and sends a corresponding text message to the appropriate telephone company systems 310, which then transmits the text message to the customer phone 110 via cell tower 320 on a cellular network. Alternatively, the telecommunication systems 310 can transmit the text message to customer phone 110 via the internet (e.g., if customer phone 110 is connected to a WiFi network).

Figure 4:
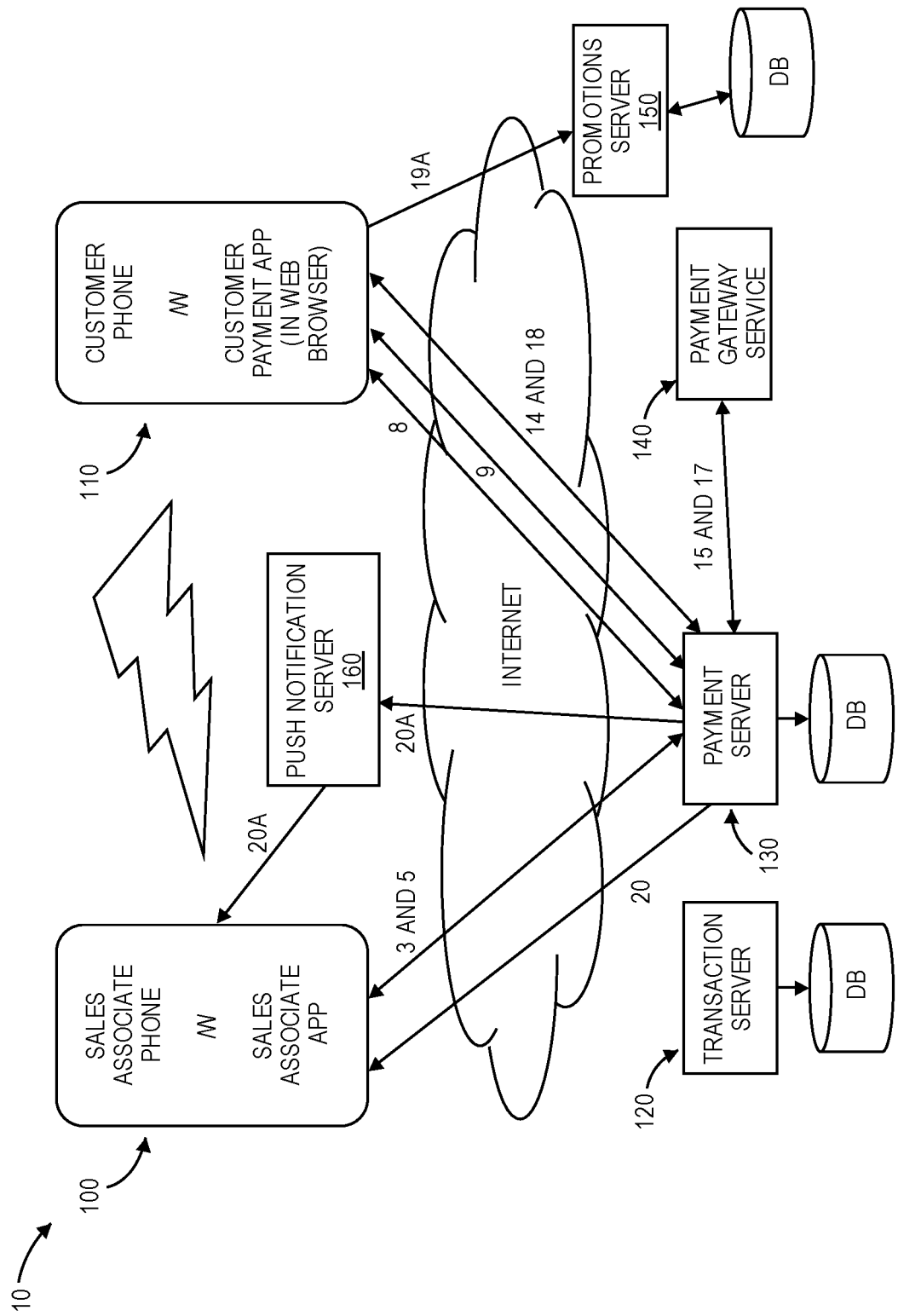
FIG. 4 illustrates the communication flow for an mPOS transaction in the mPOS system illustrated in FIG. 1 according to one or more embodiments.

FIG. 4 illustrates the communication flow in mPOS system 10 for an mPOS transaction according to one or more embodiments. The process flow for the mPOS transaction includes one or more of the steps described below. The numbers next to the arrows in FIG. 4 that extend from payment server 130 correspond to the step numbers described below.

Prior to checkout, the customer informs the sales associate which items the customer would like to purchase. The sales associate then opens the sales associate app on the sales associate phone 100. Next, using the sales associate app, the sales associate scans (e.g., a UPC symbol, an RFID tag, etc.) or manually enters (e.g., by SKU number) the items the customer intends to purchase. The scanned and/or entered items are added to a virtual "shopping bag" on the sales associate app.

Alternatively, the customer can scan or manually enter the items she intends to purchase into a virtual shopping bag using the customer payment app on the customer phone 110. In addition, or in the alternative, the customer can add items to the shopping bag before arriving at the store, for example when shopping online using a personal computer, a tablet, or customer phone 110.

When the customer is ready to checkout, the sales associate can retrieve the customer's online shopping bag. In one example, the sales associate can enter customer identity information in the sales associate app to locate the customer's account through a database query (e.g., by communicating with transactions server 120 or another server that includes customer data). In another example, the sales associate can receive the customer's shopping bag over a local network connection such as Bluetooth or NFC. In yet another example, the customer can send the sales associate a text message that includes a link (e.g., a URL) to the customer's shopping bag. In another example, the customer phone 110 can generate a QR code that contains a link to the customer's shopping bag, and the sales associate can scan the QR code using a QR code reader app on the sales associate phone 100, in a process flow similar to that described below. Each of these different options leads to a virtual shopping bag shown in the sales associate app and managed by the transaction server 120.

Figure 5:
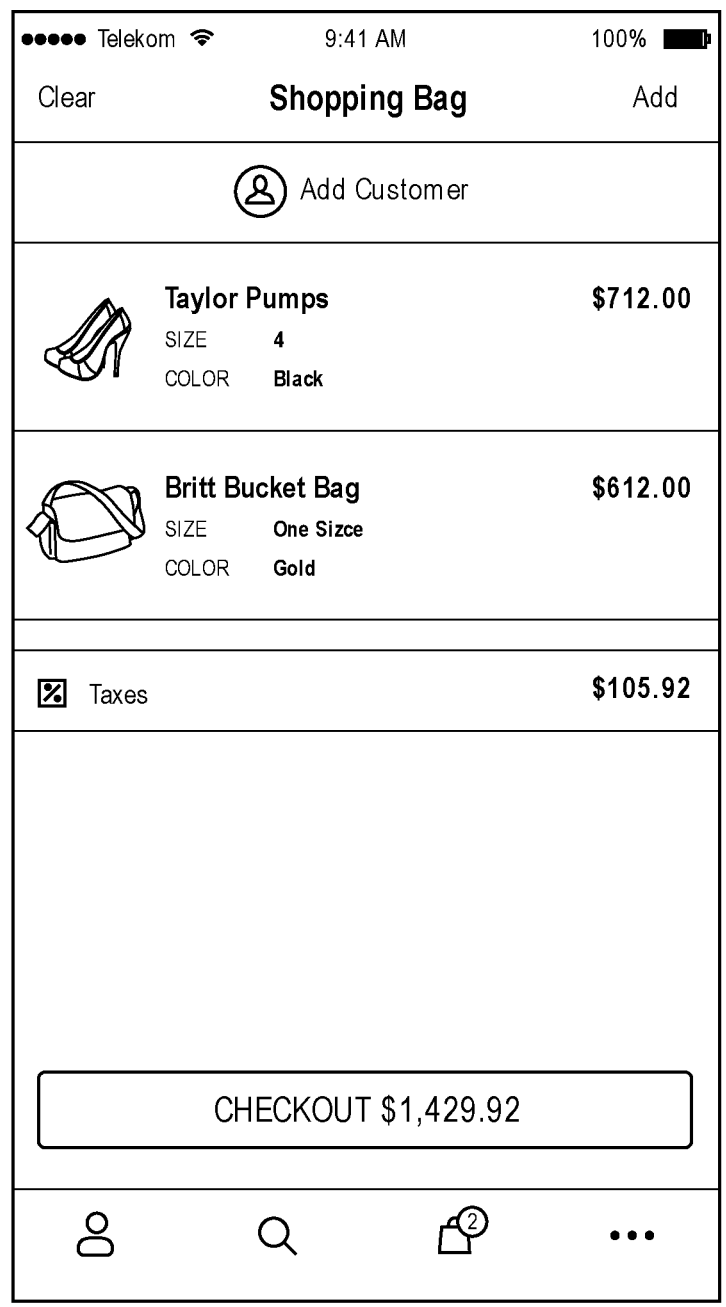
FIGS. 5, 6, and 7 illustrate example screenshots of the display on a sales associate phone according to one or more embodiments.

In step 1, the sales associate app causes the sales associate phone 100 to display the shopping bag for the customer, with all line items, discounts, tax, and total amount. Also, a "checkout" button is shown. The sales associate then taps on "checkout" in the sales associate app to proceed with the transaction. An example screenshot 50 of the display on the sales associate phone 100 in this step is illustrated in FIG. 5.

Figure 6:
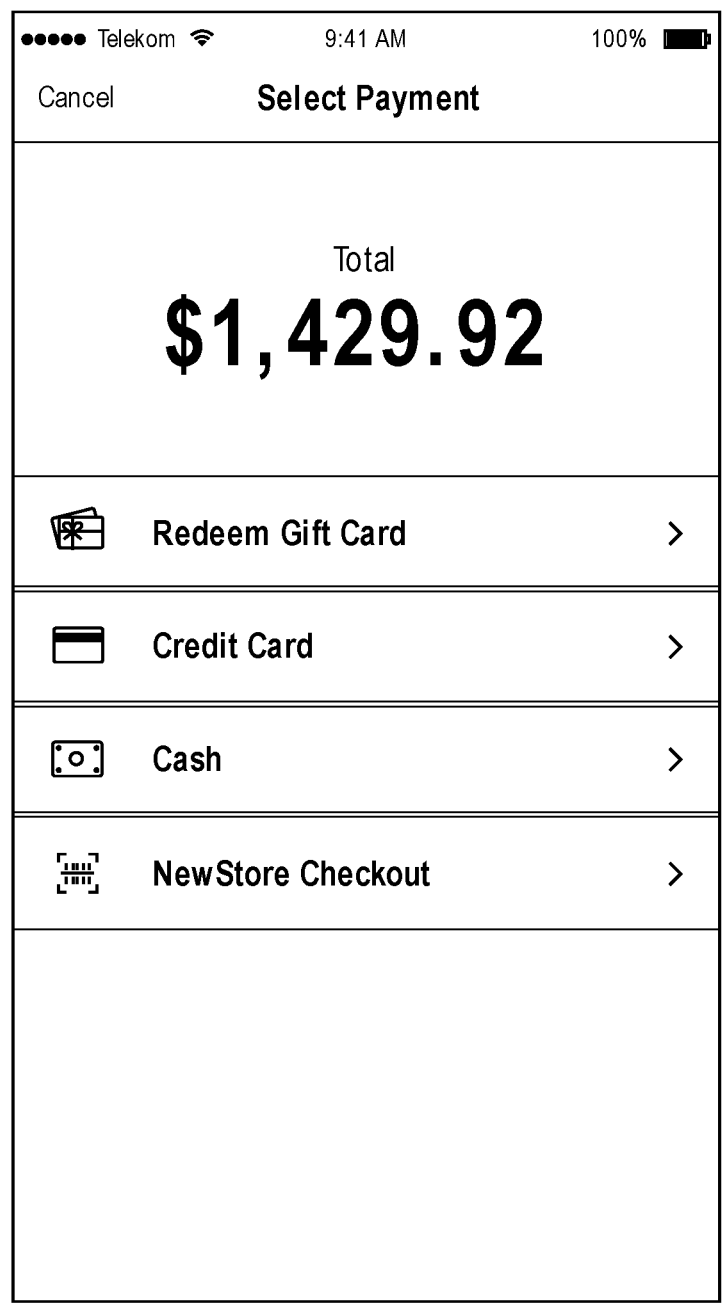

In step 2, the sales associate app prompts the sales associate to select the payment option for the customer, such as cash or gift card. One of these options is sometimes referred to by the present applicant as "NewStore Checkout," which corresponds to one or more of the embodiments described herein. The sales associate chooses the "NewStore Checkout" option in this example. An example screenshot 60 of the display on the sales associate phone 100 in this step is illustrated in FIG. 6. In some embodiments, the sales associate app can allow the sales associate to select a "split payment" option where customer payment is split between different payment instruments (e.g., gift card and credit card).

In step 3 (illustrated in FIG. 4), the sales associate phone 100, running the sales associate app, connects to payment server 130 and sends the total amount charged to the customer and other optional transaction details, for example all line items, to payment server 130. Optionally the sales associate phone 100 also sends its device address information to payment server 130 to receive a notification message therefrom. A notification message can be sent from the payment server 130 to the sales associate phone 100 after a successful or failed payment authorization. This is optional information, because the sales associate app can cause the sales associate phone 100 to regularly (or irregularly) query payment server 130 and check whether the payment has completed successfully.

In step 4, payment server 130 generates a unique order identifier and stores the total amount and the other optional transaction details in the payment server database.

In step 5 (illustrated in FIG. 4), payment server 130 returns the unique order identifier back to the sales associate app on the sales associate phone 100.

Figure 7:
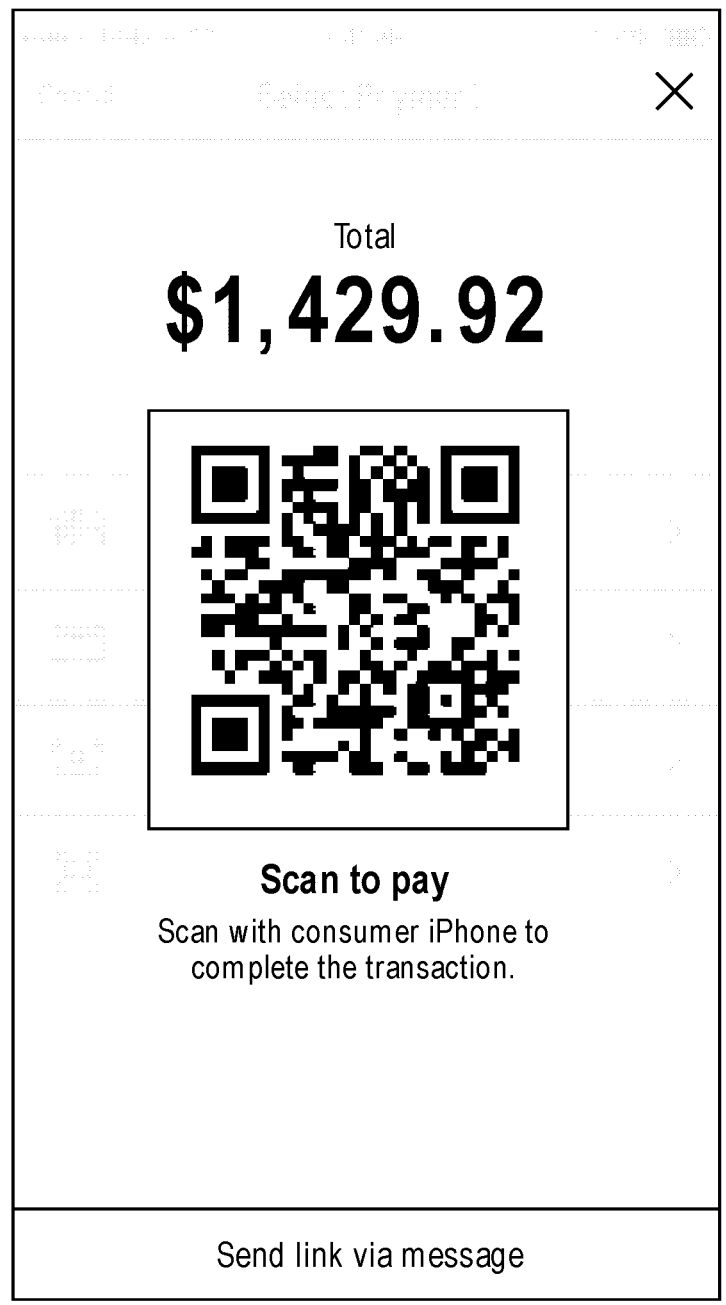

In step 6, the sales associate app generates a URL that points to payment server 130 and that contains the unique order identifier. The sales associate app then causes the sales associate phone 100 to generate and display a QR code with the URL encoded therein (e.g., according to a standard for such encoding). An example screenshot 70 of the display on the sales associate phone 100 in this step is illustrated in FIG. 7. In addition, or in the alternative, the sales associate app can provide the customer with the option to receive the URL via email or a text message. In that case the sales associate app would display a screen where the associate can enter the customer's email address or mobile phone number. After the email address or mobile phone number is entered, the sales associate app communicates with the appropriate messaging service to send a text or email message to the customer's mobile phone number or email address.

Figure 8:
FIGS. 8, 9, 10, 11, and 12 illustrate example screenshots of the display on a customer phone according to one or more embodiments.

In step 7, the sales associate shows the customer the sales associate phone with the QR code displayed. The customer then takes her customer phone 110 and enables the camera app (IOS®-based devices) or another app that supports scanning a QR code. The customer points the phone's camera towards the QR code shown on the sales associate phone 100 until the appropriate app has successfully read the QR code. The customer phone 110 decodes the URL, which was encoded in the QR code, and either immediately or after confirmation opens a web browser on customer phone 110 with the URL from the QR code. An example screenshot 80 of the display on the customer phone 110 in this step is illustrated in FIG. 8.

If the sales associate app sent an email or text message in step 6, the email or text message is received on the customer's phone 110 in step 7. The customer opens the email or text message and can see the URL embedded therein. The customer can then select the URL in the email or text message to open in the web browser on customer phone 110.

In step 8 (illustrated in FIG. 4), the URL points the web browser on the customer phone 110 to payment server 130. The URL also contains the unique order identifier. The web browser first downloads the customer payment app from the payment server 130 using the provided URL. The customer payment app then runs in the web browser on the customer phone 110. Alternatively, the customer payment app can be a dedicated app that runs natively on the customer phone 110.

In step 9 (illustrated in FIG. 4), the customer payment uses the unique order identifier (or Payment ID) to request the total order amount to be charged and other optional transaction details from payment server 130.

In step 10, the customer payment app causes the customer phone 110 to display the total amount to pay (including vendor name) and other optional transaction details (e.g., contents of shopping bag and/or price of each item) retrieved from payment server 130. The customer payment app also offers different payment options to the customer. These options can include (1) payment with payment data securely stored on the phone (e.g., using APPLE PAY®), (2) manual entry of payment data (e.g., manual entry of the credit card number and/or gift card number), and/or (3) other payment methods enabled on the customer phone 110 (e.g., PayPal ONE TOUCH™).

Figure 9:
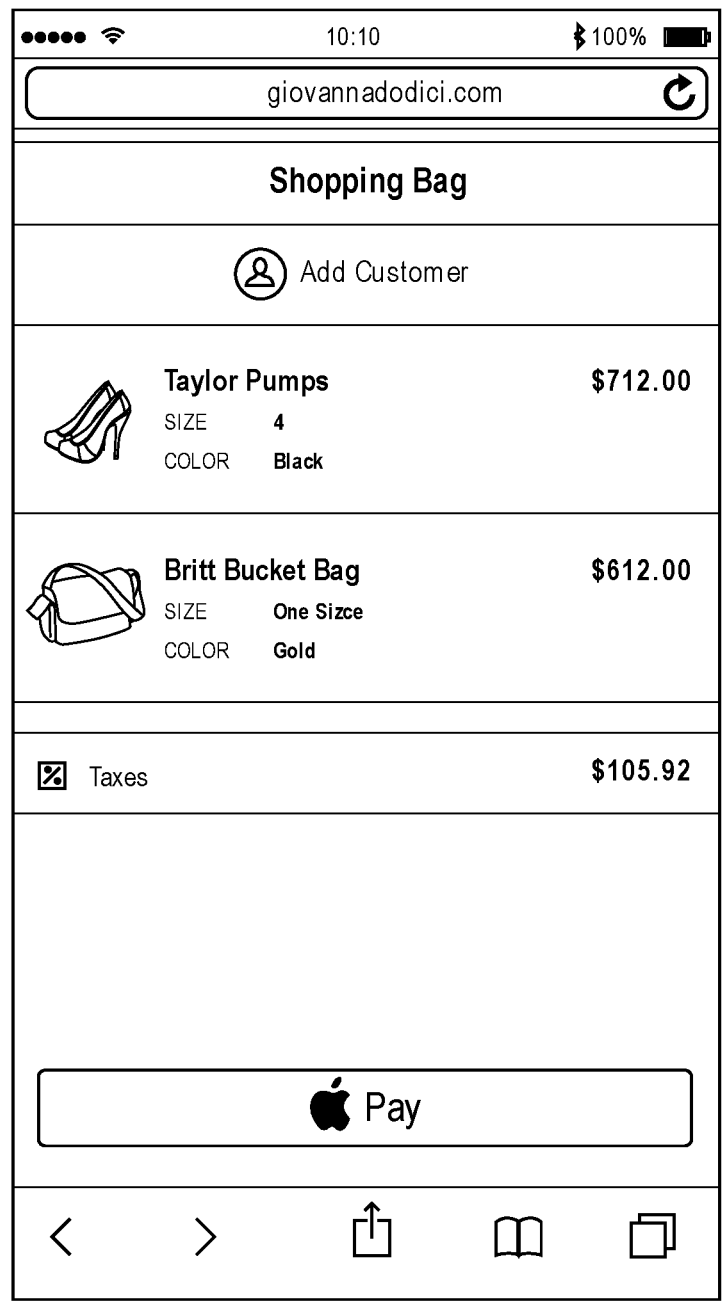

An example screenshot 90 of the display on the customer phone 110 in this step is illustrated in FIG. 9. In screenshot 90, the contents of the shopping bag, including color and size/style, and the price of each item are displayed in addition to the total amount to pay and the payment options (in this example, the only payment option is APPLE PAY®). In some embodiments, the customer payment app can allow the customer to select a "split payment" option where payment is split between different payment methods or instruments (e.g., gift card and credit card). Payment using manual entry of payment data and/or other payment methods enabled on the customer phone 110 (e.g., PayPal ONE TOUCH™) occur in a different process flow that is not described here.

Figure 10:
Figure 10:
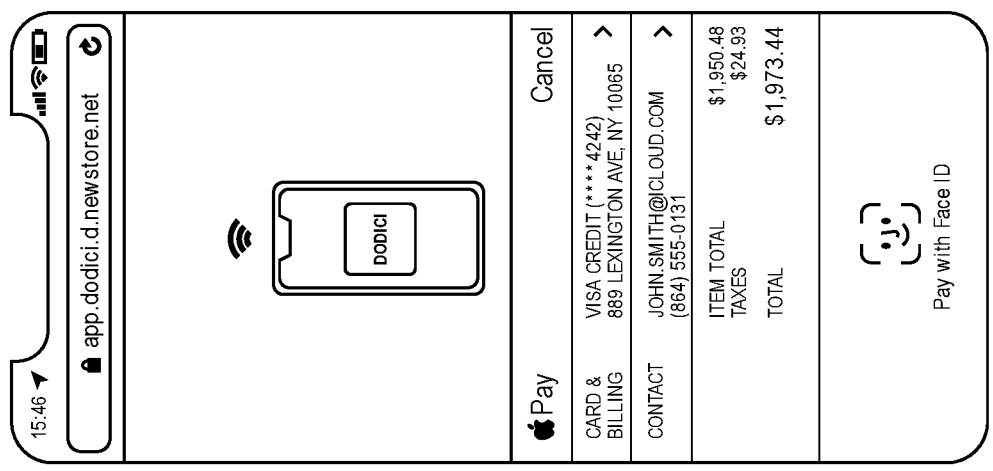
Figure 10:
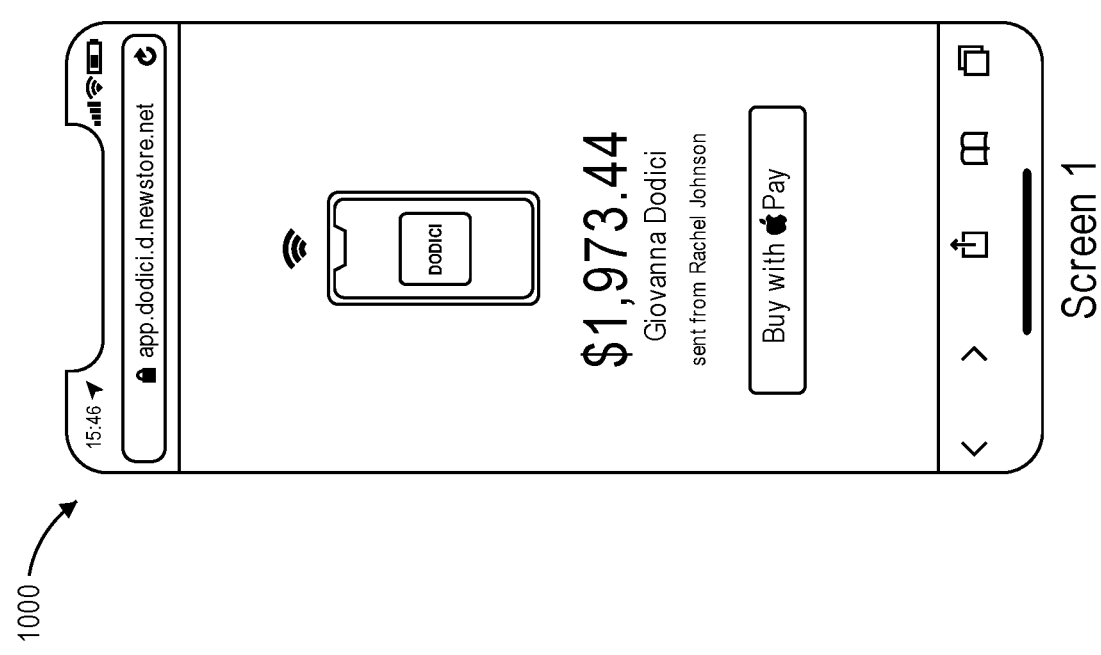

Alternatively, the customer payment app causes the customer phone 110 to display the total amount to pay (including vendor name) but does not cause the customer phone 110 to display other optional transaction details (e.g., contents of shopping bag and/or price of each item). An example screenshot 1000 of the display on the customer phone 110 in this alternative is illustrated in Screen 1 on FIG. 10.

The following steps describe secure payment with payment data securely stored on the phone (e.g., using APPLE PAY®), such as in security chip 240.

In step 11, the customer taps on the "Pay" button (e.g., the APPLE PAY® button illustrated in FIGS. 9,10) to start the secure payment.

In step 12, the customer phone 100 now displays on the screen the details for the secure payment. For example, it offers the selection of a specific credit card and it also repeats the total amount to be charge. The screen can also prompt the user to enter his/her email address and/or phone number, which can be used to send the customer a receipt, promotional materials, or other information. In some embodiments, the customer's email address and/or phone number is/are automatically transmitted with the secure payment, for example when the customer uses APPLE PAY® or PayPal ONE TOUCH™.

Figure 11:
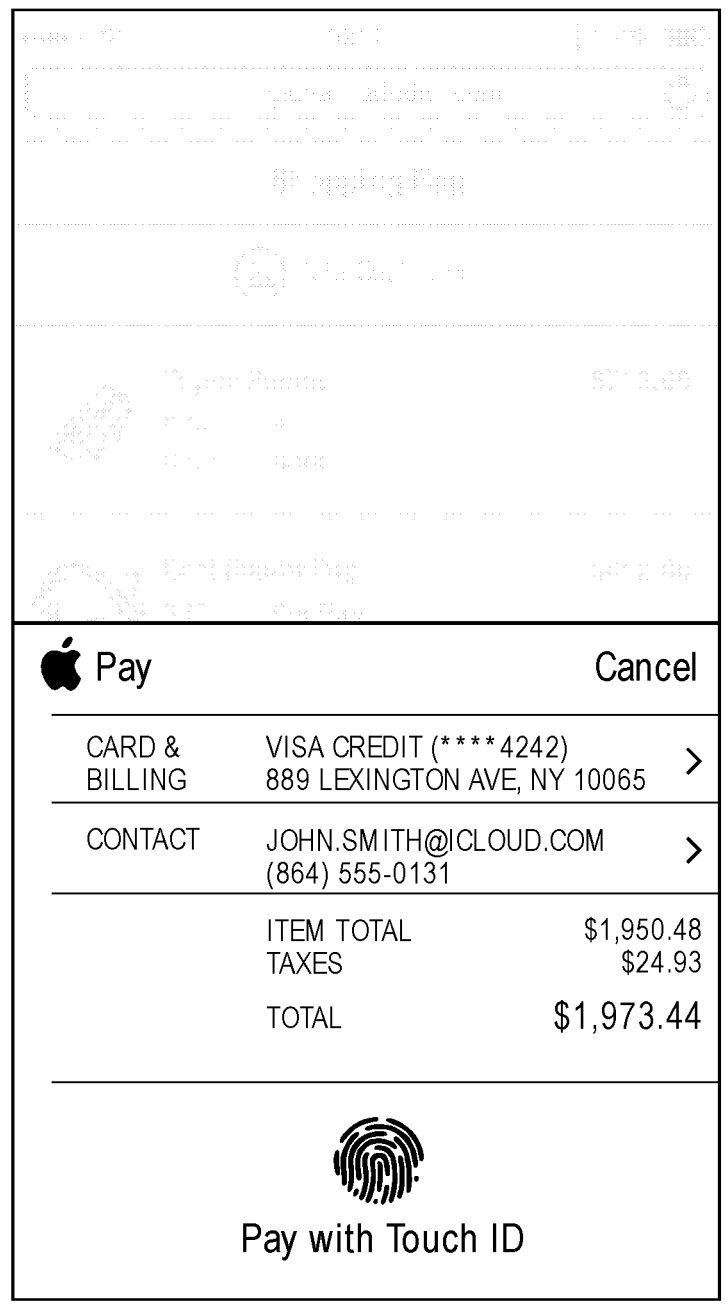

The screen also shows a call to action—that the customer must confirm the payment. The confirmation can require biometric authentication such as using a fingerprint reader, a facial recognition system, an eye scanner, and/or a voice recognition system. If the phone isn't equipped with a biometric authenticator then the customer can enter a password to confirm the payment. Both the biometric authentication and the password are tightly integrated with a secure process (e.g., security chip 240 such as Apple's Secure Enclave). The security chip 240 handles encryption and authentication and is specifically designed to prevent unauthorized access to or tampering of sensitive data stored thereon. An example screenshot 1100 of the display on the customer phone 110 in this step is illustrated in FIG. 11. In screenshot 1100, the contents of the shopping bag continue to be displayed on the secure payment authentication screen. Alternatively, the contents of the shopping bag can be omitted from the secure payment authentication screen, as illustrated in Screen 2 of screenshot 1000. Using a biometric sensor for authentication is more secure and typically leads to reduced credit card fees for the retailer.

In step 13, the customer confirms the payment and any other information entered by the customer in step 12, such as the customer's email address. The customer phone 110 then authenticates the customer through biometric recognition or a password. Examples of biometric recognition or authentication include fingerprint scans, retinal scans, and facial recognition. The customer phone 110 then provides the encrypted payment data (e.g., credit card number and/or one or more unique identifiers associated with the customer phone 110 and/or credit card number) to the customer payment app. The encrypted payment data is stored by the operating system of the customer phone 110 either in the main memory or preferably in a special security chip as discussed above. If stored in a special security chip, the encrypted data is only provided to the customer payment app with proper authentication through a biometric sensor or a passcode (e.g., as discussed above).

In step 14 (illustrated in FIG. 4), the customer payment app sends the encrypted payment data together with the unique order identifier to payment server 130. The payment server 130 then attaches the encrypted payment data, contact information, and/or any other collected information to the stored order. The payment server 130 can use the unique order identifier to look up payment details in the payment server database. If necessary, payment server 130 can also validate any of the payment data.

In step 15 (illustrated in FIG. 4), payment server 130 sends the encrypted payment data, together with other data like the total amount and a Transaction ID, to the payment gateway service 140 for authorization.

In step 16, the payment gateway service 140 decrypts the payment data and authorizes (or does not authorize) the payment, and such authorization or failure to authorize is received by the payment server 130.

In step 17, in case of successful authorization, the payment gateway service 140 sends a Payment Authorization Id and other payment-related information (e.g., the last 4 digits of the credit card number) back to the payment server 130. The payment gateway service 140 can also send the customer's email address and/or mobile phone number, which was manually or automatically provided in step 12, to the payment server 130 in this step. In case of an authorization failure, the payment gateway service 140 sends error information back to the payment server 130. That failure case is not further described in this example for purposes of brevity.

In step 18 (illustrated in FIG. 4), the payment server 130 sends a successful payment acknowledgment (e.g., successful payment message) or unsuccessful payment message back to the customer payment app on the customer phone 110. The customer payment app receives the successful or unsuccessful payment message.

In step 19, the customer payment app causes the customer phone 110 to display a message to the customer that indicates a successful payment. That screen can be also used to show promotional information (e.g., other recommended products) and/or advertisements, and/or allow the customer to provide a rating about the shopping experience. An example screenshot of the display on the customer phone 110 after a successful authorization is illustrated in Screen 3 of screenshot 1000. Alternatively, the customer payment app causes the customer phone 110 to display a message to indicate that the payment was unsuccessful.

In step 20 (illustrated in FIG. 4), the payment server 130 sends a message to the sales associate phone 100 (e.g., to the sales associate app) with the Payment Authorization Id and other payment-related information, such as the last 4 digits of the credit card and/or other information sent from payment gateway service 140. Alternatively, the payment server 130 sends an unsuccessful payment message to the sales associate phone 100. The payment server 130 can also send the customer's email address and/or mobile phone number, which was manually or automatically provided in step 12. This message can be sent with the help of push notification server/service 160, as indicated in optional step 20A. In addition, or in the alternative, the sales associate app can cause the sales associate phone 100 to poll the payment server 130 and regularly check whether the payment has been authorized.

Figure 12:
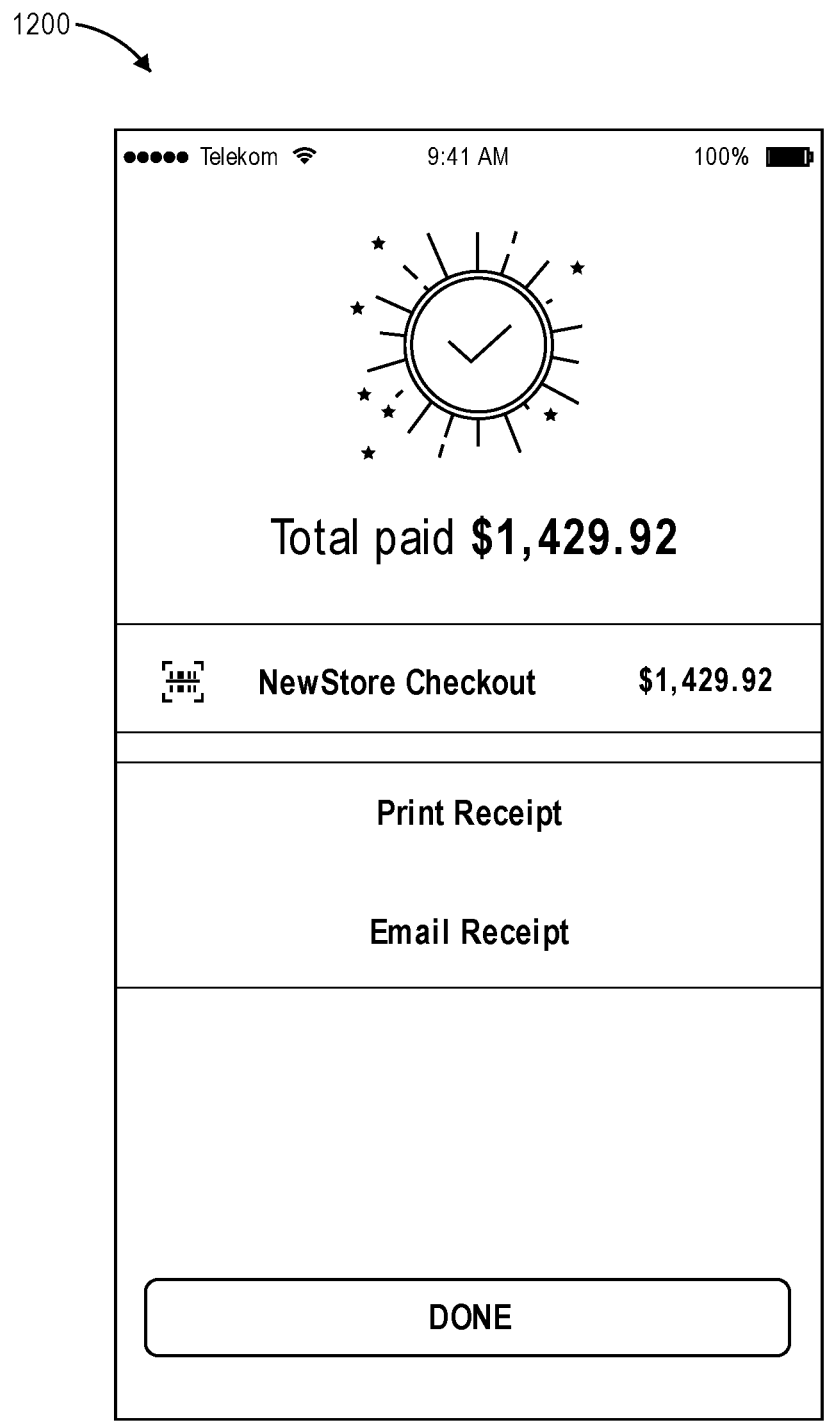

In step 21, the sales associate app causes the sales associate phone 100 to display a message indicating successful payment. The sales associate can now complete the overall checkout, e.g., by pressing a "submit" button. An example screenshot 1200 of the display on the sales associate phone 100 in this step is illustrated in FIG. 12. Alternatively, the overall checkout can be automatically completed without further involvement by the sales associate. In some embodiments, the "submit" button is provided on the sales associate phone 100 when the customer selects the "split payment" option, discussed above, after all payment authorizations have been collected. However, if the customer cancels the order using the customer payment app, the payment server 130 sends a corresponding cancelling message to the sales associate app, which causes the sales associate app to display an error message. In addition, the sales associate app can display an error or other message if the sales associate phone 100 receives an unsuccessful payment message from the payment server 130.

In step 22, the sales associate app now continues as if a payment was authorized with a locally-attached card reader. For example, the sales associate app sends the Payment Authorization Id to the transaction server 120, which then proceeds with the normal steps of the checkout. The sales associate app can optionally send additional information to the transaction server 120 that the sales associate app received from the payment server 130 in step 20, such as any other payment-related information (e.g., the last 4 digits of the credit card and/or other information that the payment server 130 received from payment gateway service 140), the customer's email address, and/or the customer's phone number. For the transaction server 120, there is no difference whether the authorization was done through a credit card reader, through manual entry of payment data, or as in this case through embodiments of the invention described herein (e.g., using applicant's presently-described NewStore Checkout).

After payment is authorized and submitted, the sales associate app causes the sales associate phone 100 to display a screen where the sales associate can select to either print or email/text a receipt to confirm the competition of the sale in step 1336 in flow chart 1330. As discussed above, the customer's email address and/or mobile phone number can be sent to the sales associate app from the transaction server if the customer provided his/her email address and/or mobile phone number automatically or manually in step 12, and the provided email address and/or mobile phone number can be used to email/text the receipt. If the customer did not provide his/her email address or mobile phone number, the selection of "email/text a receipt" causes the sales associate app to prompt the sales associate to manually enter the customer's email address and/or mobile phone number. When the sales associate selects "email/text a receipt" with a manually-entered customer email address and/or a manually-entered mobile phone number, the sales associate app sends the customer's email address and/or mobile phone number to the transaction server 120 to amend the transaction to include the customer's email address and/or mobile phone number. The transaction server 120 can then cause an email and/or text with the receipt to be generated and sent to the customer at the customer's email address and/or mobile phone number.

After successful payment, the customer's phone indicates a successful completion of the payment as described in step 19. In that moment the attention of the customer is to the phone's screen and it can be used to drive attention to further actions. For example, in optional step 19A the customer can rate the experience of the purchase (e.g., the process described above), the customer can opt-in to receiving a newsletter from the retailer, promotional products related to the completed purchase could be shown, a promotional digital coupon could be provided, a participation in a raffle could be offered, and/or the retailers ecommerce shopping site with access to the whole assortment could be shown. All this additional actions and promotional offerings can be retrieved through communication with promotions server 150. The customer payment app can generate a URL which navigates the web browser on the customer's phone to one or more new web pages that are hosted or served by the promotions server 150. The customer can then interact with the promotions server 150 (e.g., to opt-in to receiving a newsletter, to enter a raffle, etc.). The promotions server 150 can use a database to store all promotional offers and to store the customer choice such as opting-in into a newsletter.

Although this disclosure refers to sales associate phone 100 and customer phone 110, it is noted that the sales associate and/or the customer can use other mobile devices to perform the transactions and process flows described herein. For example, the sales associate phone 100 and/or the customer phone 110 can be or can include a tablet, a netbook, a laptop, and/or a smartwatch.

Figure 13:
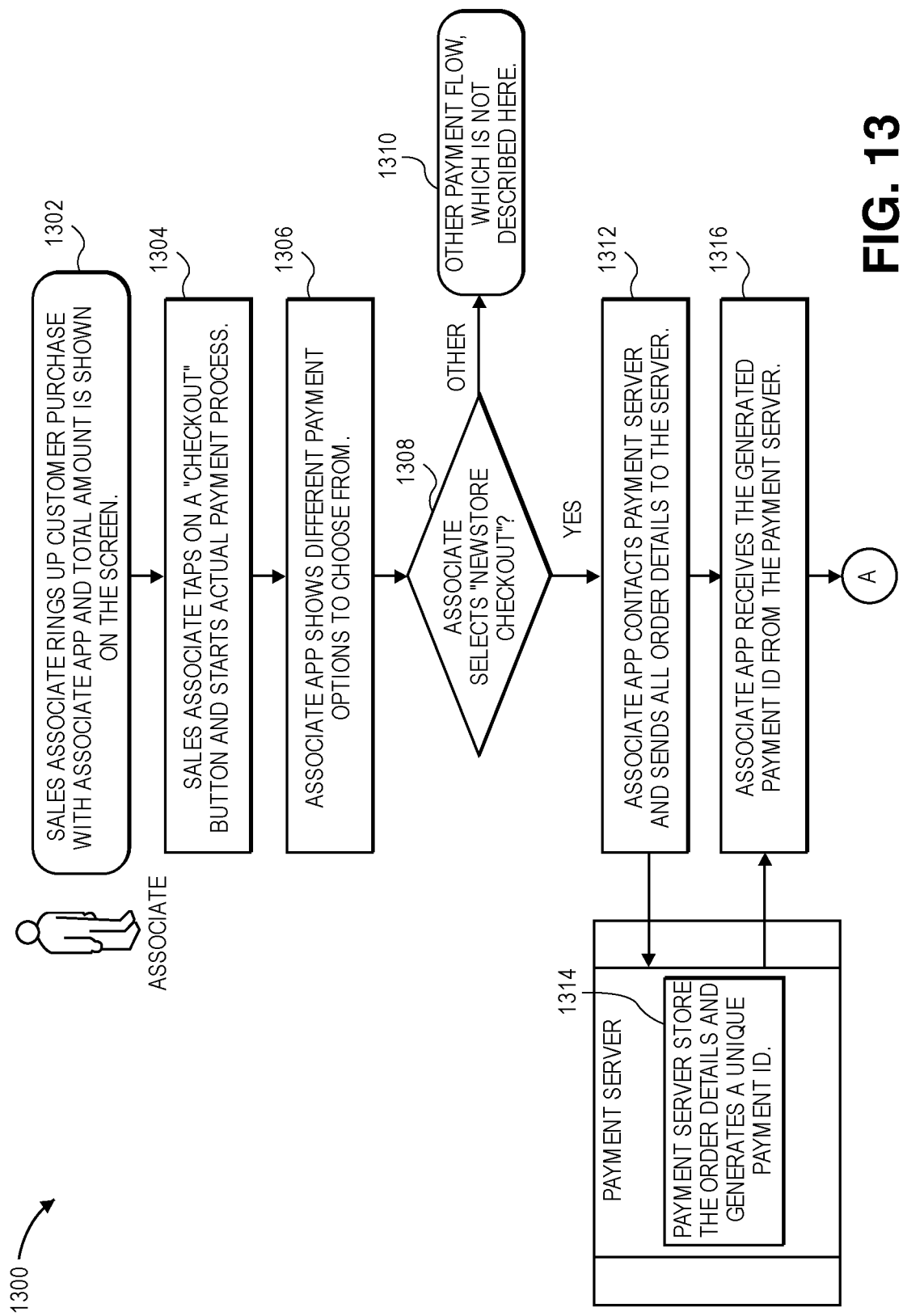
FIGS. 13 and 14 illustrate a flow chart for an mPOS transaction using the sales associate mobile device.
Figure 14:
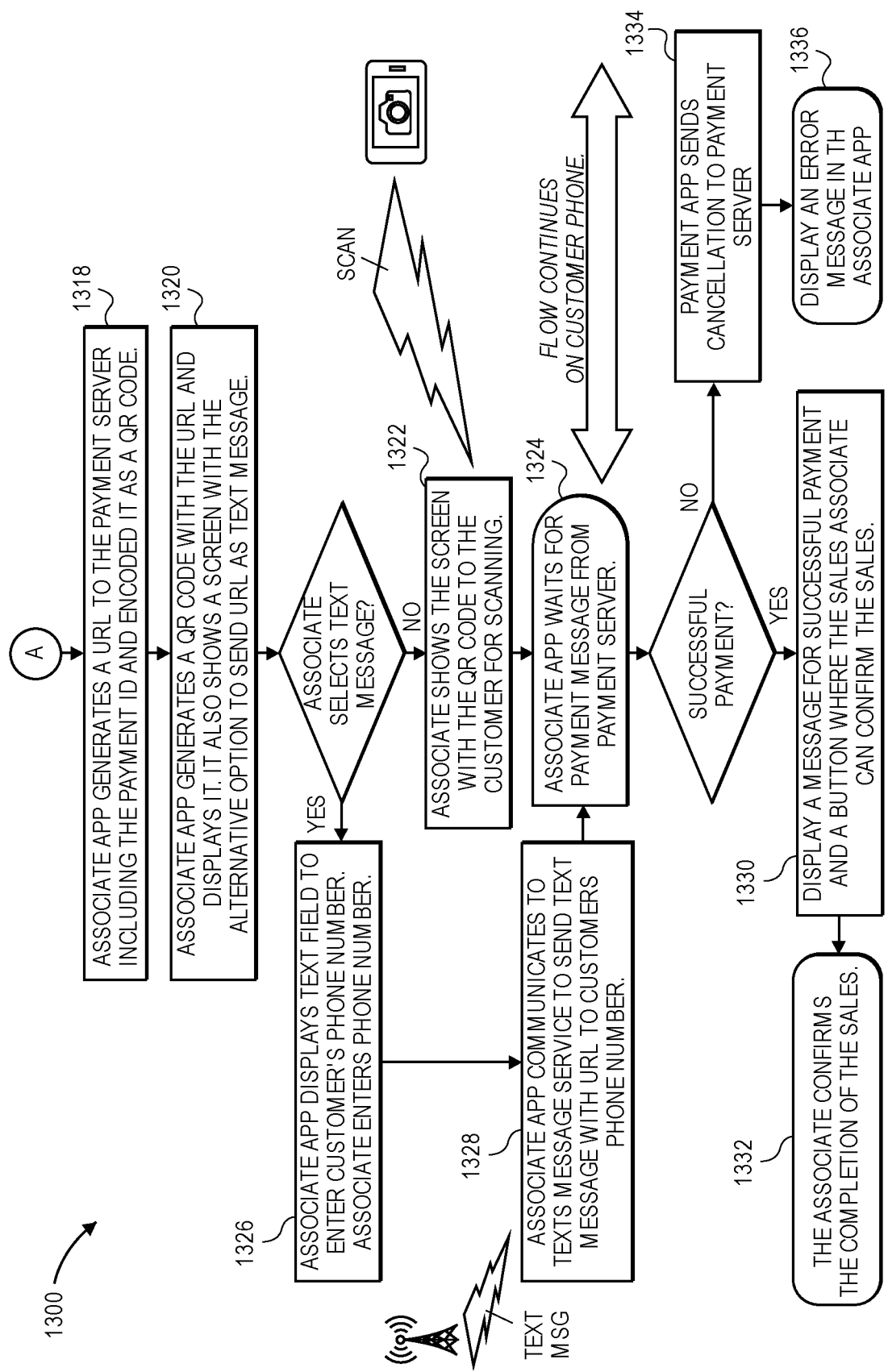

FIGS. 13, 14 illustrate a flow chart 1300 for performing an mPOS transaction using a sales associate mobile device according to one or more embodiments. In step 1302, the sales associate uses the sales associate app to place the customer's items in a virtual shopping bag. The sales associate app determines each item's price and the total price for the customer's order. The sales associate can inform the customer of the total price orally or by showing the customer the sales associate mobile device. Alternatively, the customer can use a retailer app on the customer mobile device to place the customer's items in a virtual shopping bag, and the sales associate can retrieve the customer's virtual shopping bag as discussed above. In addition, or in the alternative, the customer can place items in the virtual shopping bag remotely (e.g., using a computer at home) using the retailer's website or application.

In step 1304, the sales associate initiates checkout for the customer by pressing the "checkout" button or a similar button on the sales associate app. Pressing the checkout button initiates the payment process. In step 1306, the sales associate app displays the payment options that are available to the customer. The payment options can include paying with cash or check, paying with a gift card, manually entering a credit card number, or using NewStore Checkout.

In step 1308, the sales associate app determines which payment option was selected in step 1306. If a payment option other than NewStore Checkout was selected in step 1306, the flow chart 1300 proceeds to step 1310 where the corresponding payment flow occurs, which is not further described in this application. If NewStore Checkout was selected in step 1306, the flow chart 1300 proceeds to step 1312 where the sales associate app sends all order details (e.g., the items to be purchased, the customer's identity, store location, etc.) to the payment server (e.g., payment server 130). The payment server receives the order details and generates a unique Payment ID that corresponds to the customer's order and customer information in step 1314. In step 1316, the payment server sends the Payment ID to the sales associate app on the sales associate's mobile device where it is received.

In step 1318, the sales associate app generates a link (e.g., a URL) to the payment server that includes the Payment ID received in step 1316. The link is then encoded in as a QR code, which the sales associate app generates and displays in step 1318. The sales associate app can also provide an option to send the link via text message, email, or another medium, for example if the customer mobile device does not include a QR code reader.

If the sales associate does not select an alternative method of sending the link (e.g., via text message), in step 1322 the sales associate shows the QR code displayed on the sales associate mobile device to the customer for scanning with a QR code reader on the customer mobile device. The QR code includes a link to the payment server to retrieve the customer order details. If the sales associate selects text messaging to deliver the link to the customer, in step 1326 the sales associate app displays a text field where the sales associate (or the customer) enters the customer's mobile phone number. Alternatively, the customer payment app can display a text field to enter the customer's mobile phone number, which is then provided to the sales associate app (e.g., via a server, Bluetooth, or other method). In step 1328, the sales associate app sends a text message to the customer, using the customer's mobile phone number entered in step 1326, with a link to retrieve the customer order details.

A customer order can be associated with a unique order identifier or ID. A cost for a given transaction can be included or encoded in an order request or message, for example identifying a cost (such as a total product cost, a payment installment cost, a down payment cost, etc.).

In either case, in step 1324 the sales associate waits while the customer pays for the customer order using NewStore Checkout after which a payment message is received from the payment server. If the payment message indicates that payment was successful, in step 1330 the sales associate app displays a message to inform the sales associate that the payment was successful and a button where the sales associate can confirm/finalize the sale in step 1332. If the payment message indicates that payment was not successful, in step 1334 the customer payment app sends an order cancellation request to the payment server. In step 1336, the sales associate app displays an error message to inform the sales associate that the customer's payment was unsuccessful.

Figure 15:
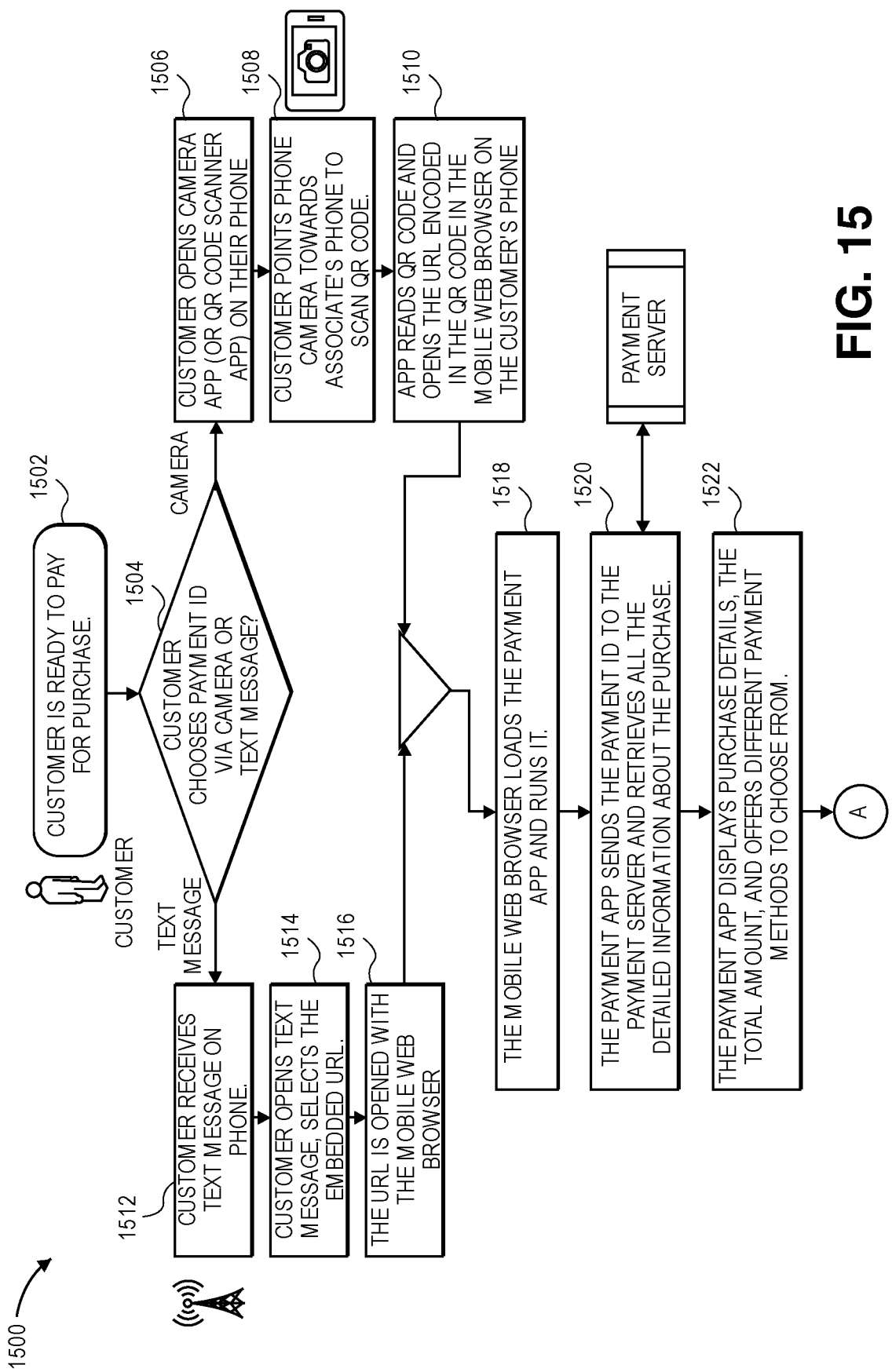
FIGS. 15, 16, and 17 illustrate a flow chart for an mPOS transaction using the customer mobile device.
Figure 16:
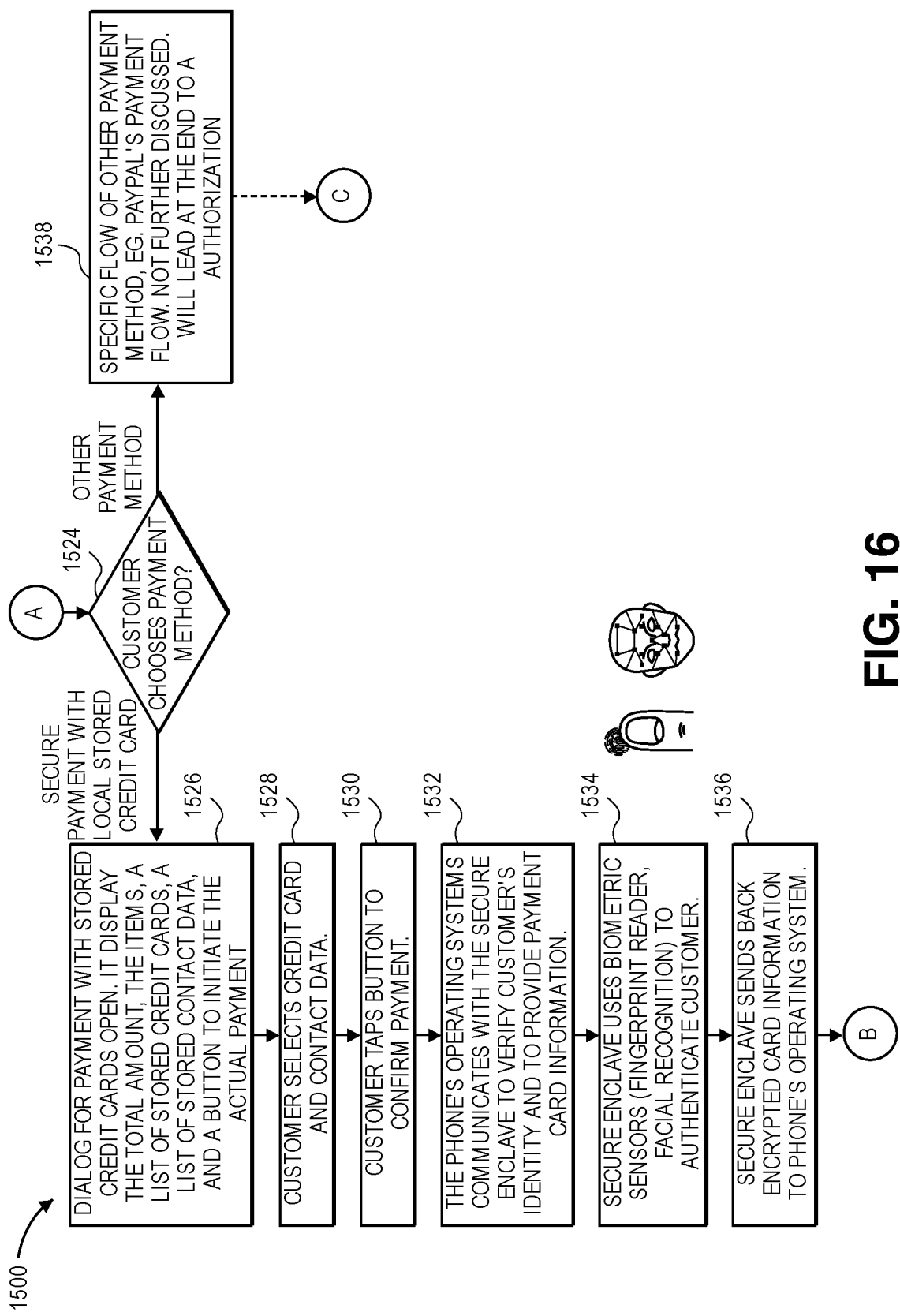
Figure 17:
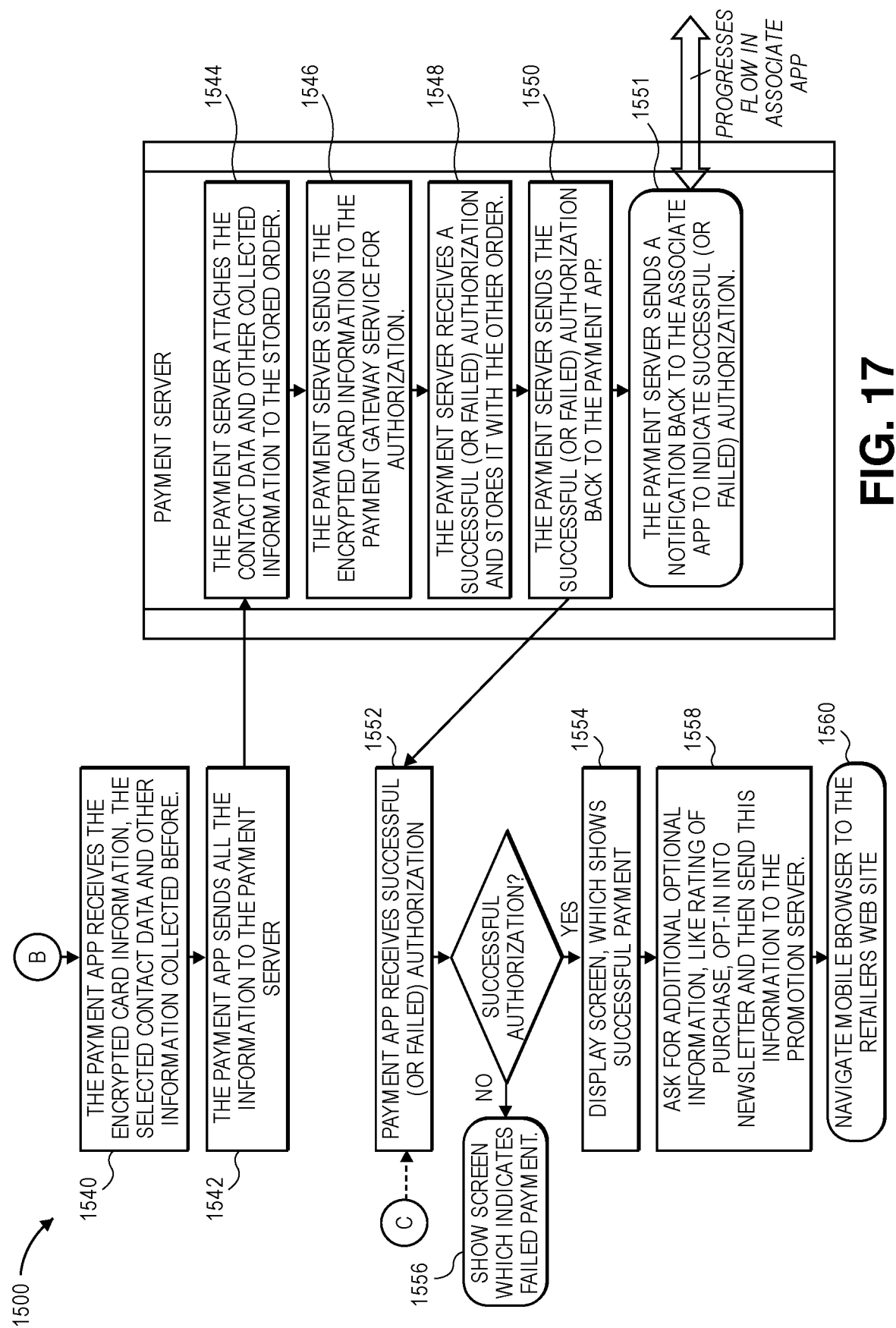

FIGS. 15-17 illustrate a flow chart 1500 for performing an mPOS transaction using a customer mobile device according to one or more embodiments. In step 1502, the customer informs the sales associate that he/she is ready to purchase items and checkout. The customer can inform the sales associate in person or through a button on the customer payment app. In step 1504, the customer informs the sales associate whether to send the link with the Payment ID, discussed above, using an optical method (e.g. QR code) that can be read with the camera on the customer mobile device (e.g., with a QR code reader) or using a text message (or email or another medium as discussed email).

If the customer chooses to receive the link with the Payment ID optically, the customer opens the camera app or a dedicated QR code scanner app on the customer mobile device in step 1506. Next, the customer directs the camera towards the sales associate phone to scan the displayed QR code in step 1508. In step 1510, the camera app or the dedicated QR code scanner app reads the QR code and opens the encoded link (e.g., URL) with the Payment ID in the web browser on the customer mobile device.

If the customer chooses to receive the link with the Payment ID via text message, in step 1512 the customer receives a text message, sent by the sales associate, that includes the link with the Payment ID. In step 1514, the customer opens the text message and selects the link which opens in the web browser on the customer mobile device in step 1516.

After the link is opened in the web browser on the customer mobile device in step 1510 or 1516, the web browser loads and runs the customer payment app in step 1518. In step 1520, the customer payment app sends the Payment ID to the payment server and retrieves the customer order information, which can include each item or SKU number, its price, and the total price for the customer order. In step 1522, the web browser and/or the customer payment app displays the customer order details and displays the available payment methods including using a locally-stored credit card through NewStore Checkout. The customer selects one of these payment methods in step 1524, which can occur using the customer payment app or by the customer informing the sales associate who then selects the payment method on the sales associate app.

If the customer selects using a locally-stored credit card through NewStore Checkout in step 1524, the flow chart 1500 proceeds to step 1526. If the customer selects another payment method in step 1524, the flow chart 1500 proceeds to step 1538, which is not further discussed in this application.

In step 1526, the customer payment app displays at least some of the locally-stored payment information for the customer to choose and a button to initiate payment. Some stored payment information (e.g., the full credit card number) may not be displayed in step 1526 to protect the data from theft. Examples of the stored payment information that can be displayed in step 1526 includes locally-stored credit and/or debit cards (e.g., the last 4 digits and/or the type of card (e.g., MASTERCARD®, etc.)) and locally-stored contact data.

In step 1528, the customer selects one of the locally-stored credit or debit cards and the corresponding contact data, and the customer presses the button to initiate payment in step 1530. In step 1532, the customer mobile device's operation system communicates with the security chip (e.g., the "Secure Enclave" on the IPHONE®) to verify the customer's identity and to provide the customer's payment information. Those skilled in the art will understand that the named technologies herein are provided by way of example, but other similar or equivalent or developed technologies satisfying some or all of the same functionality may be substituted or used in various embodiments. In step 1534, the security chip authenticates the customer for example by comparing prestored biometric data with new biometric data provided by the customer. Examples of such biometric data can include a scanned fingerprint, facial recognition, and/or a scanned retina. Alternatively, the security chip can authenticate the customer via a prestored password (e.g., by comparing a password input by the customer with a prestored password). The prestored biometric data, password, and payment information can be stored on the security chip. If the customer's identity is authenticated in step 1534, the security chip provides the customer's contact data and an encrypted version of the customer's payment information to the customer mobile device's operating system in step 1536 where it can be accessed by the customer payment app in step 1540. The customer payment app then sends the customer's contact data and encrypted payment information to the payment server in step 1542.

In step 1544, the payment server associates the received contact data and encrypted payment information to the customer's order (e.g., using the unique Payment ID). Next, the payment server sends the encrypted card information to the payment gateway service (e.g., payment gateway service 140) for processing and authorization in step 1546. In step 1548, the payment server receives a successful or failed payment authorization from the payment gateway service and stores the (un)successful (successful or unsuccessful) payment authorization with the customer's order. The payment server then sends the (un)successful payment authorization to the customer payment app on the customer mobile device in step 1550, which is received by the customer payment app in step 1552. Step 1552 can also be reached by paying using other payment methods 1538. The payment server sends the (un)successful payment authorization to the sales associate app in step 1551.

If the payment authorization was successful, the customer payment app displays a successful payment notice on the customer mobile device in step 1554. If the payment authorization was unsuccessful, the customer payment app displays a failed payment notice on the customer mobile device in step 1556. After displaying the successful payment notice in step 1554, the customer payment app can ask for or display additional information in optional step 1558. For example, in step 1558, the customer payment app can ask the customer to rate the payment experience and/or to opt into receiving a newsletter, email communication, promotions, etc. The customer can send the customer's responses (e.g., rating, opt ins) to a promotion server (e.g., promotion server 150). After optional step 1558, the customer payment app can cause the web browser on the customer mobile device to navigate to the retailer's web site or to another web site (e.g., an advertiser's web site).

With regard to certain preferred embodiments and modes of operation, the present disclosure comprehends a mobile communication device, e.g., a customer mobile communication device. This can be a personal smart phone or wireless computing device that has a processor, instructions, a user interface (e.g., touch screen, keypad or similar video and/or tactile and/or audio interface), as well as a physical security means or physical authentication unit having thereon secure authentication data or information relating to an owner or user of the customer mobile communication device. The device is configured and arranged to communicate securely with a payment server over a network communication link. The payment server may be operable to manage, coordinate and cooperate with other servers that can process bank payments, credit card payments, electronic payments, crypto-currency payments and so on. A customer order is identified in preferred embodiments by a unique customer order ID encoding information about an order for goods or services wanted by said customer. The order can encode order data or customer data and can be used to generate secure payment requests to the payment server.

The payment server can furthermore communicate with a sales associate device that can be a mobile communication device or may be a smart store device at or near a point of sale such as a checkout register.

Upon successful authentication and completion of payment, the payment server can coordinate sending a confirmation of payment signal or message to the customer and/or sales associate communication devices. This way the sales associate or device can allow the customer to take any physical goods just paid for and leave the store.

Thus, this disclosure and claims provide new and novel improvements to existing methods and technologies, which were not previously known nor implemented to achieve the useful results described above. Users of the disclosed method and system will reap tangible benefits from the functions now made possible on account of the specific modifications described herein causing the effects in the system and its outputs to its users. It is expected that significantly improved operations can be achieved upon implementation of the claimed invention, using the technical components recited herein. Again, the existing mPOS systems require that the retailer invest in specialized equipment such as credit card readers for the sale associates' mobile devices. Such devices increase the retailers' costs and also increase the risk that the customers' credit card information may be compromised on the sales associates' mobile devices. There is no known technology or method for coordinating and performing a retail checkout using a sales associate's mobile device and a customer's mobile device. The functionality available by the claimed invention(s), which overcome(s) problems in the present field, is directly attributable to the technical modifications and innovations described herein and cannot be performed by human mental process alone. For example, the disclosed modifications to the sales associate app and to the customer payment app allow the customer to retrieve order data from the payment server and to pay for an order using the customer mobile device. The disclosed modifications also allow the customer to pay for an order using an encrypted version of a prestored credit card, which the customer payment app can access after the user confirms his/her identity using a biometric sensor and/or by entering a password.

Having thus described several aspects and embodiments of the invention, it is to be appreciated that various alterations, modifications, and improvements will readily occur to those of ordinary skill in the art. Such alterations, modifications, and improvements are intended to be within the spirit and scope of the invention described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will appreciate the many equivalents to the specific embodiments described herein. It is, therefore, to be understood that the foregoing embodiments are presented by way of example only and that inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in numerous ways. One or more aspects and embodiments of the present application involving the performance of processes or methods may utilize program instructions executable by a device (e.g., a computer, a hardware processor, or other device) to perform, or control performance of, the processes or methods.

In this respect, various inventive concepts may be embodied as a non-transitory computer readable storage medium (or multiple non-transitory computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various one or more of the aspects described above. In some embodiments, computer readable media may be non-transitory media.

The terms "program," "software," "application," and "app" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A computer-implemented method for secure checkout at a point of sale, comprising:
   on a customer mobile communication device that includes a hardware processor and a physical authentication unit that is separate from and coupled to said processor, the customer mobile communication device associated with a customer:
      detecting and decoding a physical communication signal from a sales associate device, by way of a physical signal sensor or receiver in said customer mobile communication device, the physical communication signal encoding a selectable link providing access to a customer payment application and further encoding a unique customer order identifier associated with an order being processed at said point of sale;
      on said customer mobile communication device, activating said customer payment application by actuation of said selectable link on a user interface of said customer mobile communication device;
      on said customer mobile communication device, sending a customer order request, corresponding to said customer unique order identifier, over a secure communication connection, to a payment server;
      on said customer mobile communication device, receiving, in response to the customer order request, customer order data including a cost for the customer order;
      on said customer mobile communication device, generating a secure payment request;
      on said customer mobile communication device, authenticating the customer using customer authentication data securely stored on said physical authentication unit that is on the customer mobile communication device and separate from said processor of said customer mobile communication device;
      on said customer mobile communication device, retrieving customer payment account information from said physical authentication unit that is on the customer mobile communication device and separate from said processor of said customer mobile communication device;
      on said customer mobile communication device, encoding said customer payment account information in said secure payment request;
      on said customer mobile communication device, sending said customer payment request including said customer payment account information from the customer mobile communication device to the payment server, over said secure communication connection; and
      on said customer mobile communication device, receiving a payment authorization message from said payment server responsive to the sent customer payment request.

2. The computer-implemented method of claim 1, further comprising linking a secure payment method with the customer account.

3. The computer-implemented method of claim 1, further comprising biometrically authenticating the customer against authentication data securely stored in said physical authentication unit and in response to the secure payment request.

4. The computer-implemented method of claim 3, further comprising receiving biometric authentication data from a fingerprint reader, a facial recognition system, an eye scanner, or a voice recognition system, or a combination of any of the foregoing.

5. The computer-implemented method of claim 4, further comprising determining whether the biometric authentication data matches prestored biometric data, the prestored biometric data stored in the physical authentication unit.

6. The computer-implemented method of claim 1, said physical signal sensor comprising an optical sensor or camera, the method further comprising scanning a bar code or QR code displayed on the sales associate device, the bar code or QR code encoding said selectable link and encoding said unique customer order identifier.

7. The computer-implemented method of claim 1, said physical signal sensor comprising a radio receiver, the method further comprising receiving a message from the sales associate device, by email, SMS or radio frequency packet, encoding said selectable link and encoding said unique customer order identifier.

8. The computer-implemented method of claim 1, further comprising, after receiving the payment authorization message from the payment server, displaying an advertisement or a promotional offer on the customer mobile communication device.

9. The computer-implemented method of claim 1, wherein the customer order data includes an indication of at least one item to be purchased by the customer.

10. The computer-implemented method of claim 1, further comprising sending a confirmation regarding said payment authorization message to the sales associate device.

11. The computer-implemented method of claim 1, wherein said on a customer mobile communication device: detecting and decoding a physical communication signal from a sales associate device, by way of a physical signal sensor or receiver in said customer mobile communication device, the physical communication signal encoding a selectable link providing access to a customer payment application and further encoding a unique customer order identifier associated with an order being processed at said point of sale comprises:
   on a customer mobile communication device: detecting and decoding a physical communication signal from a retail store's sales associate phone in the retail store, by way of a physical signal sensor or receiver in said customer mobile communication device, the physical communication signal encoding a selectable link providing access to a customer payment application and further encoding a unique customer order identifier associated with an order being processed at said point of sale.

12. The computer-implemented method of claim 11, wherein said on a customer mobile communication device: detecting and decoding a physical communication signal from a retail store's sales associate phone in the retail store, by way of a physical signal sensor or receiver in said customer mobile communication device, the physical communication signal encoding a selectable link providing access to a customer payment application and further encoding a unique customer order identifier associated with an order being processed at said point of sale comprises:
on a customer mobile communication device in the retail store: detecting and decoding a physical communication signal from a retail store's sales associate phone in the retail store, by way of a physical signal sensor or receiver in said customer mobile communication device, the physical communication signal encoding a selectable link providing access to a customer payment application and further encoding a unique customer order identifier associated with an order being processed at said point of sale.

13. The computer-implemented method of claim 12, wherein said on a customer mobile communication device: detecting and decoding a physical communication signal from a retail store's sales associate phone in the retail store, by way of a physical signal sensor or receiver in said customer mobile communication device, the physical communication signal encoding a selectable link providing access to a customer payment application and further encoding a unique customer order identifier associated with an order being processed at said point of sale comprises:
on a customer mobile communication device in the retail store: detecting and decoding a physical communication signal from a retail store's sales associate phone in the retail store, by way of scanning a bar code or QR code displayed on the retail store's sales associate phone, wherein the bar code or QR code on the retail store's sales associate phone encodes a selectable link providing access to a customer payment application and further encodes a unique customer order identifier associated with an order being processed at said point of sale.

14. The computer-implemented method of claim 12, wherein said on a customer mobile communication device: detecting and decoding a physical communication signal from a retail store's sales associate phone in the retail store, by way of a physical signal sensor or receiver in said customer mobile communication device, the physical communication signal encoding a selectable link providing access to a customer payment application and further encoding a unique customer order identifier associated with an order being processed at said point of sale comprises:
on a customer mobile communication device in the retail store: detecting and decoding a physical communication signal from a retail store's sales associate phone in the retail store, by way of receiving a message, via email or text message or radio frequency packet, from the retail store's sales associate phone, wherein the message, via email or text message or radio frequency packet, from the retail store's sales associate phone encodes a selectable link providing access to a customer payment application and further encodes a unique customer order identifier associated with an order being processed at said point of sale.

15. The computer-implemented method of claim 12, wherein said on said customer mobile communication device, sending a customer order request, corresponding to said customer unique order identifier, over a secure communication connection, to a payment server comprises:
on said customer mobile communication device, sending a customer order request that includes said customer unique order identifier, over a secure communication connection, to a payment server; and
wherein said on said customer mobile communication device, receiving, in response to the customer order request, customer order data including a cost for the customer order comprises:
on said customer mobile communication device, receiving, in response to the customer order request that includes said customer unique order identifier, customer order data including a cost for the customer order.

16. The computer-implemented method of claim 12, wherein said on said customer mobile communication device, sending a customer order request, corresponding to said customer unique order identifier, over a secure communication connection, to a payment server comprises:
on said customer mobile communication device, sending a customer order request, corresponding to said customer unique order identifier, over a secure communication connection, to a payment server without prior communication between said customer mobile communication device and said payment server; and
wherein said on said customer mobile communication device, receiving, in response to the customer order request, customer order data including a cost for the customer order comprises:
on said customer mobile communication device, receiving, in response to the customer order request sent to said payment server without prior communication between said customer mobile communication device and said payment server, customer order data including a cost for the customer order.

17. The computer-implemented method of claim 12, wherein said on said customer mobile communication device, sending a customer order request, corresponding to said customer unique order identifier, over a secure communication connection, to a payment server comprises:
on said customer mobile communication device, sending a customer order request that includes said customer unique order identifier, over a secure communication connection, to a payment server without prior communication between said customer mobile communication device and said payment server; and
wherein said on said customer mobile communication device, receiving, in response to the customer order request, customer order data including a cost for the customer order comprises:
on said customer mobile communication device, receiving, in response to the customer order request that includes said customer unique order identifier and is sent to said payment server without prior communication between said customer mobile communication device and said payment server, customer order data including a cost for the customer order.

18. A customer mobile communication device associated with a customer and configured and arranged to conduct secure transactions at a point of sale, the customer mobile communication device comprising:

a hardware processor;

a secure communication interface operatively coupled to said hardware processor;

a user interface of said customer mobile communication device operatively responsive to inputs by said customer and outputs from said hardware processor;

a physical signal sensor or receiver operatively coupled to the processor;

a physical authentication unit that is separate from and operatively coupled to the processor;

a non-transitory memory operatively coupled to the processor, the non-transitory memory comprising:

computer-readable instructions that cause the physical signal sensor or receiver to detect and decode a physical communication signal, sent by a sales associate device at said point of sale, the physical communication signal encoding a selectable link providing access to a customer payment application and further encoding a unique customer order identifier associated with an order being processed at said point of sale;

computer-readable instructions that cause the user interface to present a selectable link corresponding to the customer payment application;

computer-readable instructions that cause the secure communication interface to send a customer order request, corresponding to said customer unique order identifier, to a payment server;

computer-readable instructions that cause the secure communication interface to receive, in response to said customer order request, customer order data including a cost for the customer order;

computer-readable instructions that cause said processor to generate a secure payment request;

computer-readable instructions that cause said physical authentication unit and processor to authenticate said customer on the customer mobile communication device using authentication data securely stored in said physical authentication unit that is on the customer mobile communication device and separate from said processor of said customer mobile communication device;

computer-readable instructions that retrieve customer payment account information from said physical authentication unit that is on the customer mobile communication device and separate from said processor of said customer mobile communication device;

computer-readable instructions that encode said customer payment account information in said secure payment request;

computer-readable instructions that cause the secure communication interface to send said customer payment request including said customer payment account information from the customer mobile communication device to the payment server, over said secure communication connection; and computer-readable instructions that receive a payment authorization message from said payment server responsive to the sent customer payment request.

19. The device of claim 18, further comprising one or more biometric authentication sensors for authenticating a user of said device with a registered owner thereof using stored secure authentication data in said physical authentication unit.

20. The device of claim 18, wherein the computer-readable instructions further cause the physical authentication unit to biometrically authenticate the user in response to the secure payment request.

21. The device of claim 20, wherein the computer-readable instructions further cause the processor to receive biometric authentication data from any of a fingerprint reader, a facial recognition system, an eye scanner, and a voice recognition system, or a combination of more than one of the foregoing.

22. The device of claim 18, said physical sensor or receiver comprising an optical sensor or camera that senses an optical QR code or bar code.

23. The device of claim 18, said physical sensor or receiver comprising a radio receiver that senses a radio signal encoding a message in an email or SMS text format.

* * * * *